United States Patent
Ishii et al.

(10) Patent No.: US 6,741,065 B1
(45) Date of Patent: May 25, 2004

(54) ELECTRIC DEVICE AND METHOD FOR CHARGING AND DISCHARGING BATTERY UNIT OF THE SAME

(75) Inventors: Hiroshi Ishii, Tachikawa (JP); Takashi Aoki, Tachikawa (JP); Nobuhito Ohnuma, Atsugi (JP)

(73) Assignee: Tokyo R & D Co., Ltd., Tokyo (JP)

( * ) Notice: Subject to any disclaimer, the term of this patent is extended or adjusted under 35 U.S.C. 154(b) by 0 days.

(21) Appl. No.: 10/030,165

(22) PCT Filed: Jul. 31, 2000

(86) PCT No.: PCT/JP00/05141

§ 371 (c)(1),
(2), (4) Date: Jan. 30, 2002

(87) PCT Pub. No.: WO01/11754

PCT Pub. Date: Feb. 15, 2001

(30) Foreign Application Priority Data

Aug. 3, 1999 (JP) ............................. 11-220503

(51) Int. Cl.[7] ................................. H02J 7/00
(52) U.S. Cl. .................................... 320/122
(58) Field of Search ................. 320/104, 119, 320/120, 102, 103, 106, 124, 122, 127, 135, 132; 307/10.7, 9.1, 10.6, 11; 180/65.2, 65.6, 65.4; 340/636, 648

(56) References Cited

U.S. PATENT DOCUMENTS

| | | | |
|---|---|---|---|
| 4,455,523 A | 6/1984 | Koenck | 320/131 |
| 5,541,489 A | 7/1996 | Dunstan | 320/134 |
| 5,557,188 A * | 9/1996 | Piercey | 320/134 |
| 5,818,200 A | 10/1998 | Cummings et al. | 320/116 |
| 5,847,912 A | 12/1998 | Smith et al. | 361/93.1 |
| 5,889,386 A | 3/1999 | Koenck | 320/136 |
| 5,969,624 A * | 10/1999 | Sakai et al. | 340/636 |

FOREIGN PATENT DOCUMENTS

| | | |
|---|---|---|
| EP | 0 834 977 A2 | 4/1988 |
| EP | 665628 * | 1/1995 |
| EP | 0 895 151 A1 | 2/1999 |
| JP | 6-111852 | 4/1994 |
| JP | 698522 * | 8/1995 |
| JP | 728613 * | 8/1996 |
| JP | 8-336205 | 12/1996 |
| JP | 11-285159 | 10/1999 |
| JP | 2000-235065 | 8/2000 |

OTHER PUBLICATIONS

Kahlen, et al. "*Battery Management with a Two Wire Buss for Single Cell Charging and Measurement*" Int'l. Electric Vehicle symposium, vol. 1, Oct. 1996—pp. 79–83.

* cited by examiner

*Primary Examiner*—Pia Tibbits
(74) *Attorney, Agent, or Firm*—Westerman, Hattori, Daniels & Adrian, LLP

(57) ABSTRACT

An electric device comprises a plurality of detachable battery units (2, 3, 4), each consisting of a set of storage battery packs (2B, 3B, 4B) and memories (11, 12, 13) storing information about the charge and discharge states of the battery packs. Connectors are provided to connect and disconnect an electric device (1) electrically incident to each battery unit being attached or detached. The device includes a driver (9) for driving a load, a charger (5) for charging the storage battery packs (2B, 3B, 4B) by referring to the information stored in the memories (11, 12, 13) of the respective mounted battery units (2, 3, 4), and a controller (6) for controlling the electric power supplied from the individual battery units (2, 3, 4) to the driver (9) by referring to the above-mentioned information.

14 Claims, 17 Drawing Sheets

F I G. 6
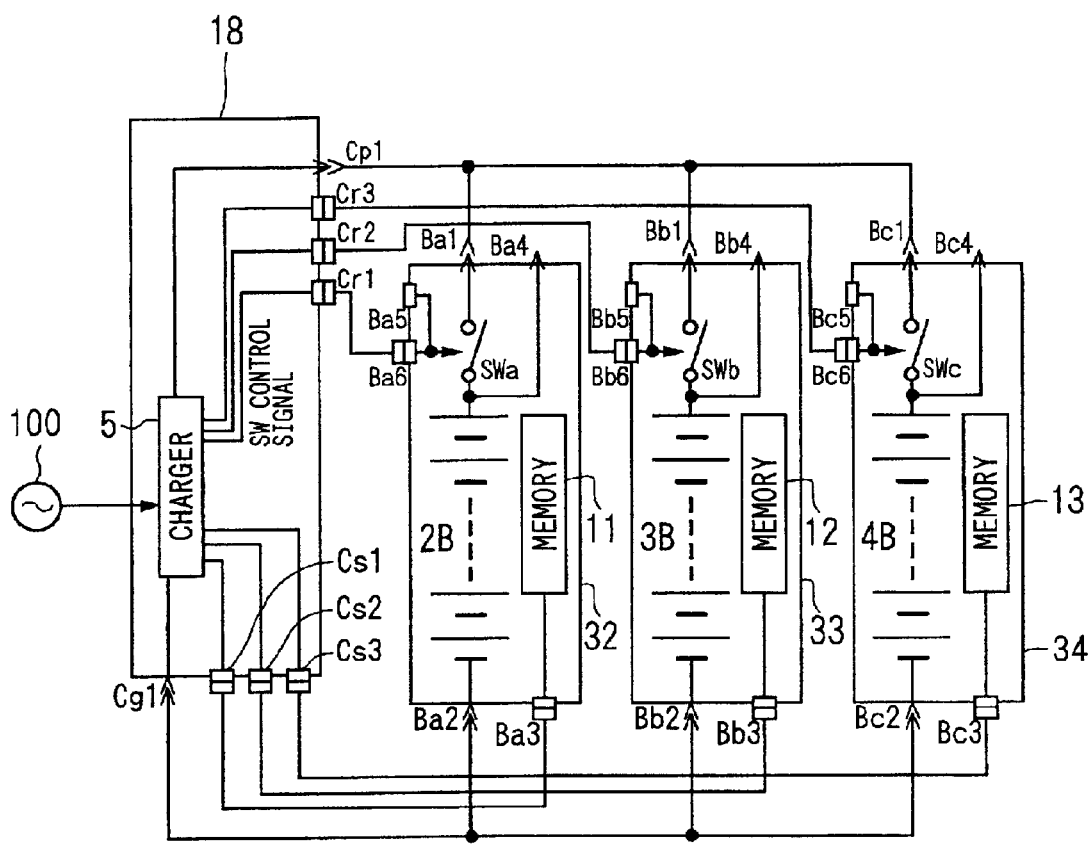

F I G. 9
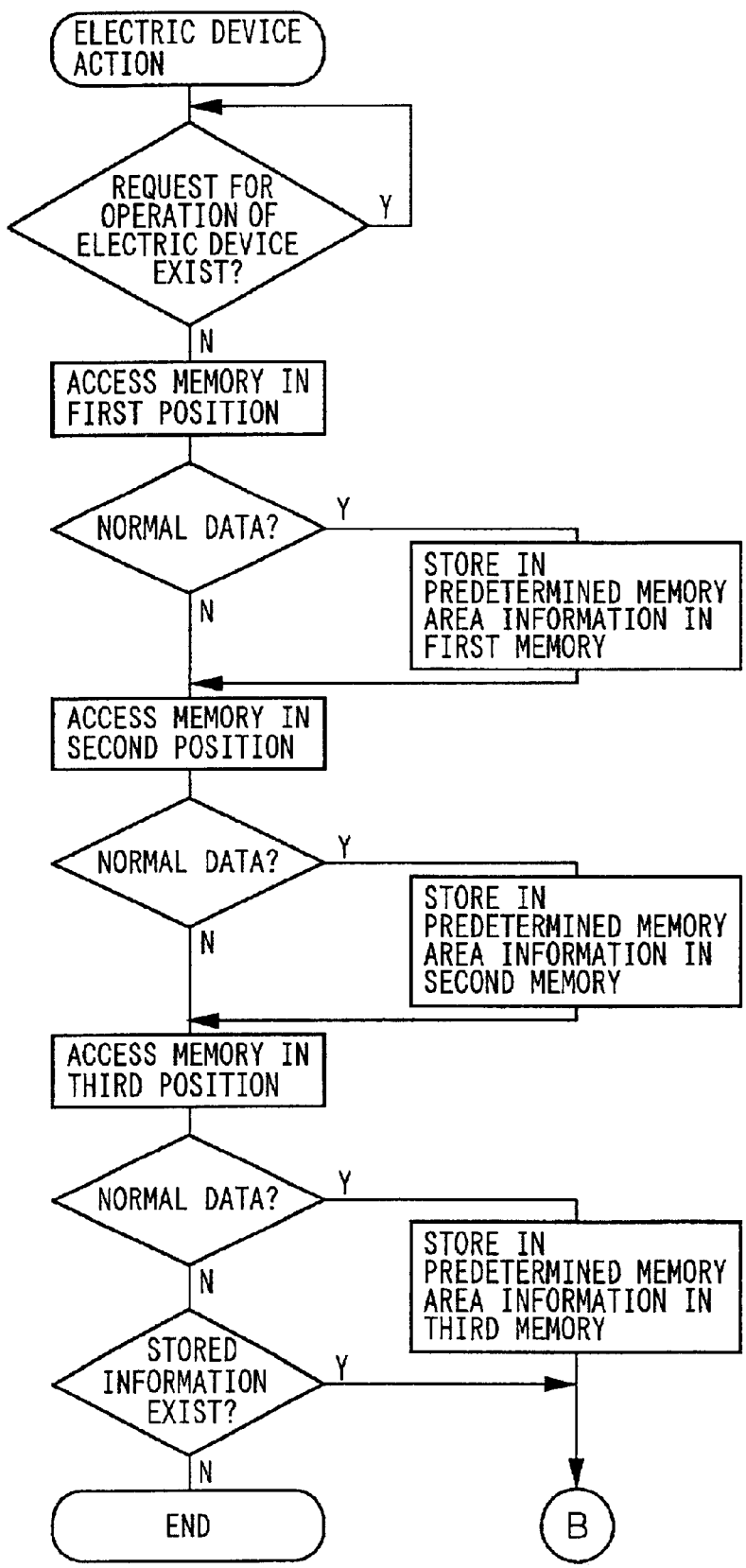

ELECTRIC DEVICE AND METHOD FOR CHARGING AND DISCHARGING BATTERY UNIT OF THE SAME

TECHNICAL FIELD

The invention relates to an electric device such as an electric vehicle of an electric bicycle, an electric wheelchair, or the like using electric energy by a battery as a power supply and a method for charging and discharging a battery unit of the electric device.

BACKGROUND TECHNOLOGY

There is an electric vehicle such as an electric bicycle or an electric wheelchair on which a storage battery pack composed of a plurality of storage batteries is mounted as a power supply. The vehicles of this type include one running only on a driving force of a motor driven by electric energy (electric power) from the mounted storage battery pack, one running on the resultant force of a driving force of a motor and human power, one selectively using a driving force of a gasoline engine and a driving force of a motor, and the like.

The storage battery mounted on these vehicles as a power supply needs to be frequently charged, and there are methods for charging it, that is, a simplex charging method of charging the battery detached from the vehicle and a mounted-on-vehicle charging method of charging the battery mounted on a vehicle.

For example, a storage battery of a large capacity with a heavy weight, as compared to the weight of a vehicle main body, may need to be mounted on an electric device such as an electric vehicle. In this case, it is difficult to detach and carry the storage battery by hand because of the heavy weight thereof. For this reason, the vehicle, an electric device, is provided with a charging apparatus, and the vehicle is moved and near a commercial power supply. Meanwhile, in the case of a storage battery mounted on the vehicle with a relatively light weight, one charge method is detaching the storage battery from the vehicle and connecting it to a charging apparatus, which is separately positioned.

A conventional electric device using a storage battery pack as the storage battery and a method for charging the storage battery pack are explained here using FIG. 15 to FIG. 20B.

FIG. 15 to FIG. 17 show examples of an electric device on which a battery section and a charging apparatus therefor are fixedly mounted. Each of electric devices 200, 210 and 220 is composed of a charging apparatus 201, a battery section 202, a controlling apparatus 203, and a driving apparatus 204, which are connected in parallel, and a motor 205, which is driven by the driving apparatus to drive a running section such as wheels.

In each of these electric devices, electric power from battery section 202 is supplied to the driving apparatus 204 to drive the motor 205, whose motive power drives the running section, such as wheels. The controlling apparatus 203 controls action of the driving apparatus 204.

The electric device 200 shown in FIG. 15, on which a set of storage battery pack 202a composed of, for example, a lead storage battery is mounted as the battery section 202, is often used for an electric wheelchair, an electric scooter, or the like. The weight of the battery section 202 in the case of the storage battery pack 202a, composed of the lead storage battery is as heavy as about 30 kg to 60 kg.

On the electric device 210 shown in FIG. 16, plural sets of storage battery packs 202a are mounted as the battery section 202, which can be constituted by connecting in parallel m rows of storage battery packs 202a each of which is constituted by connecting n single storage batteries in series.

The electric device 220 shown in FIG. 17 has thereon a plurality of (m pieces) storage battery pack units 202b connected in parallel as the battery section 202, in which each storage battery pack unit 202b is constituted by connecting n single storage batteries in series.

These electric devices 210 and 220 are heavily used for an electric vehicle operated for a long time, an electric device for moving an object having a large weight, an electric fork lift or an electric carrier vehicle requiring a large capacity or a power supply of bulk power. These devices often have a battery section 202 having a weight of more than about 60 kg.

Since each of the electric devices 200, 210 and 220 has thereon the battery section 202 and the charging apparatus 201 for charging it, charging is performed for the storage battery pack or packs 202a or the storage battery pack units 202b of the battery section 202 by moving or transporting the electric device together with the vehicle near a commercial power supply 100, connecting the commercial power supply 100 to the charging apparatus 201, and supplying a charging current to the battery section 202 by the charging apparatus 201. Alternatively, the battery section 202 can be detached from the vehicle and charged by a special apparatus.

It should be noted that in the electric devices 210 and 220 shown in FIG. 16 and FIG. 17, it is also possible to charge and discharge a plurality of storage battery packs 202a or storage battery pack units 202b as a unit, each constituting the battery section 202.

On the other hand, electric devices 300, 310 and 320 shown in FIGS. 18A, 19A and 20A have no charging apparatuses thereon, and charging apparatuses 301 respectively shown in FIGS. 18B, 19B and 20B are provided in a garage or at a rest area. Each battery section 302 in FIG. 18, FIG. 19A or FIG. 20A is composed of storage battery packs 302a or storage battery pack units 302b, as in the battery section 202 in FIG. 15, FIG. 16 or FIG. 17, but is a unit attachable/detachable to/from the main body of the electric device 300, 310 or 320 and provided with connectors 306a and 306b for establishing electrical connection to the main body. The other structures are the same as in the electric devices shown in FIG. 15 to FIG. 17.

When charging is performed for the battery section 302 detachably mounted on the electric device 300, 310 or 320, the charging is performed by detaching the battery section 302 from the device main body and moving and installing it in the charging apparatus 301, which is separately placed and connected to the commercial power supply 100, as shown in FIG. 18B, FIG. 19B or FIG. 20B.

As the storage battery packs 302a or the storage battery pack units 302b of the battery section 302, for example, a nickel-cadmium (Ni—Cd) battery having a relatively light weight of about 1.8 kg to 3.5 kg is used and mounted on an electrically assisted bicycle or the like.

When a not-so-large battery capacity and supply power of the battery section are required, as in the electrically assisted bicycle, the battery section is of a weight easily portable by human power, and thus it is easy to detach the battery section from the vehicle for charging.

However, the battery section of a typical electric device is inconvenient because it has a considerably heavy weight. Charging should be performed by moving the electric device (vehicle) itself to a place having a chargeable power supply, such as the commercial power supply or the like, or by transporting the battery section using a transporter to a place where a charging apparatus is provided.

Further, since only one of (one set of) battery section 202 or 302 is mounted on the above-described electric device, when the battery section becomes unusable because the storage state of its storage battery packs fall below a predetermined specified value (which is decided in accordance with specifications of the battery, requirements for the electric device, and the like), the electric device itself becomes unusable, even if the controlling apparatus, the driving apparatus, and the like, except the battery section, are usable. Thus, if the battery section is detachable, the battery section which becomes unusable should be exchanged for another battery section for powering the electric device.

Alternatively, it is necessary to charge the battery section, which has become unusable because the storage state of its storage battery pack falling below the specified value. In this case, there is an additional problem that it takes a long time to charge the battery section enough to make the electric device usable, unless a charging apparatus having a capacity large enough is used.

Furthermore, as for the battery section, when the battery section is constituted by connecting in parallel a plurality of storage battery packs or storage battery pack units as in the above-described electric device shown in FIG. 16 and FIG. 17 or FIG. 19A and FIG. 20A, it is necessary to limit the variation in the charge amount to within an allowable range or to provide means for controlling it so as not to cause the variation among the storage battery packs or the storage battery pack units.

Especially when a nickel-cadmium (Ni—Cd) battery, a nickel metal hydride (Ni-MH) battery, or the like is used for the battery section, a so-called memory effect occurs such that the capacity of the battery decreases due to the use of the battery while charging and discharging are repeated with the discharge depth being shallow, and thus means for preventing this is necessary.

Further, when regenerative electric power from a load side, such as a motor or the like, is recovered for the battery section, charging often becomes impossible, depending on the state of the battery section or the degree of discharge, which prevents the regenerative electric power from being stored efficiently.

Therefore, a method of supplying power for an electric vehicle and an apparatus therefor are proposed which are configured such that storage battery packs each having a required capacity are mounted in a divided form in accordance with characteristics of an electric vehicle, and the storage battery packs are made connectable in series or in parallel to be charged or discharged singly or in combination as required, thereby improving the radiation property of the heat from the storage battery packs during charge and discharge to reduce the deterioration caused by heat so as to prolong storage battery pack life, and further the remaining capacities and the charge states of the storage battery packs can be recognized easily (See JP, 9-298805, A)

In this electric vehicle, the storage battery packs are connected in parallel to produce a large current when its load is large at the time of starting, accelerating, or the like, and a single or a plurality of the storage battery packs as required discharge a small current when its load becomes smaller at the time of traveling at a constant speed after the start, or the like.

The plurality of the storage battery packs are mounted and fixed on the vehicle in a manner not to contact each other.

Further, the management of the storage battery packs in this electric vehicle is conducted based on the use of the storage battery packs in a fully charged state and by a method of discharging one of the plurality of the storage battery packs and, after the charge the storage battery pack depletes, discharging the next storage battery pack.

As described above, this electric vehicle is configured such that the plurality of the storage battery packs discharge on a one-set basis and the remaining capacities of the remaining storage battery packs can be displayed when the above discharge ends, to enable easy recognition of the remaining capacities of the storage battery packs in the whole device. In the case of charging the storage battery packs, control of the device is conducted so that the charge is performed in a reverse order to that of the discharge. In other words, charge needs to be performed to be a full charge without fail.

However, since the plurality of the storage battery packs connected in parallel discharge respectively when a large current discharge is required because of a large load at the time of starting, accelerating, or the like, and a single or a plurality of the storage battery packs as required discharge a small current at the time of a light load such as at traveling at a constant speed, it is difficult to appropriately manage the remaining capacities of the storage battery packs, which presents the problem that it is impossible to conduct control for the most efficient charge and discharge.

Especially when using the storage battery packs in which a so-called memory effect occurs that the capacity of the battery decreases due to the use of it while charge and discharge are repeated with the discharge depth being shallow, it is desirable to conduct an optimal charge and discharge control for individual storage battery packs to prevent the memory effect, but such control is difficult.

Further, when the storage battery packs, which have ended discharge to the specified remaining capacities, are detached from the vehicle and charged by a charging apparatus at another place, it is impossible to check the charge and discharge states thereof with the storage battery packs detached and then conduct an optimal control because of the batteries being under standardized sequential management.

It is an object of the invention to solve the above-described problems in the conventional electric device and to enable an appropriate management and an efficient use, all the time, of a battery section provided with storage battery packs. More specifically, matters listed in the following are its objects.

(1) To facilitate detachment and carrying of the battery section by hand to eliminate the need to move the electric device at the time of charging and to eliminate the need for a special carrier for transporting the battery section.

(2) To improve usage of the battery section in the electric device for ease of use.

(3) To make it possible to perform operation and charge of the electric device in parallel without need for a special charging apparatus.

(4) To make it possible to manage battery characteristics of the battery section and freely select charge and discharge in accordance with the battery characteristics.

(5). To prevent a so-called memory effect when a secondary battery (storage battery), such as a Ni—Cd battery, in which the memory effect occurs is used as the battery section of the electric device and to eliminate the need for refresh thereof.

(6) To improve detection accuracy of charge and discharge states of the individual storage battery packs in the plurality of the battery sections.

(7) To prolong storage battery pack life.

(8) To make it possible to use even different types of storage battery packs in combination.

(9) To facilitate charge by placing the charging apparatus at a battery station and to make it possible to recognize the charge and discharge states of the battery section at a high accuracy, even when it is detached from the electric device so as to enable an optimal charge control.

Further, to recover the regenerative electric power from a load side such as a motor or the like to the battery section so as to utilize it efficiently.

DISCLOSURE OF THE INVENTION

To achieve the above-described objects, the invention provides an electric device and a charging apparatus for charging a battery unit thereof, and a method for charging and discharging the battery unit as follows.

The electric device according to the invention comprises: a plurality of battery units detachably mounted thereon, each battery unit constituted by pairing a storage battery pack with a memory for storing at least information about charge and discharge states of the storage battery pack; and connectors provided on each battery unit and a battery unit installation section on a device main body side, for performing electrical connection/disconnection to/from the device main body side incident to attachment/detachment of the battery unit.

Additionally, a driver for driving a load, a charger for charging the storage battery pack by referring to the information stored in the memory of each mounted battery unit, and a controller for controlling the supply of electric power from each battery unit to the driver by referring to the information stored in the memory of each mounted battery unit, which are provided on the device main body side, and the charger includes means for reading at least the information about charge and discharge states of the storage battery pack stored in the memory of each battery unit, and means for writing into the memory at least the information about charge and discharge states of the storage battery pack in the same unit.

Here, the storage battery pack includes various types of secondary batteries such as a nickel-cadmium battery and a nickel metal hydride battery. The memory is a nonvolatile memory such as an EEPROM, a flush ROM, a RAM backed up by a battery, or the like, into which various kinds of information are written which include at least the information about charge and discharge states of the storage battery pack by the charger or the controller provided in the battery unit or on the electric device main body side. In addition, the information of the type and characteristics of the storage battery pack can also be written into them in advance.

As for this battery unit, the charge and discharge states of the storage battery pack included therein can be recognized precisely by referring to the information stored in its memory, even when it is mounted on the electric device or it is detached therefrom to be in a single state, and thus an appropriate charge and discharge control can be conducted all the time.

The electric device may comprise: a plurality of battery units detachably mounted thereon, each battery unit constituted by integrating a storage battery pack, a memory for storing at least information about charge and discharge states of the storage battery pack, and a charger for charging the storage battery pack; connectors provided on each battery unit and a battery unit installation section on a device main body side, for performing electrical connection/disconnection to/from the device main body side incident to attachment/detachment of the battery unit; and a driver for driving a load and a controller for controlling supply of electric power from each battery unit to the driver by referring to the information stored in the memory of each mounted battery unit, which are provided on the device main body side.

In this case, the charger of each battery unit has means for deciding a charge order by mutually referring to the information stored in the memory of each mounted battery unit.

Further the electric device may comprise: a plurality of battery units detachably mounted thereon, each battery unit constituted by pairing a storage battery pack with a memory for storing at least information about charge and discharge states of the storage battery pack, and provided with a switch connected to the storage battery pack in series; connectors provided on each battery unit and a battery unit installation section on a device main body side, for performing electrical connection/disconnection to/from the device main body side incident to attachment/detachment of the battery unit; and a driver for driving a load, a charger for charging the storage battery pack through the switch by referring to the information stored in the memory of each mounted battery unit, and a controller for controlling supply of electric power from the storage battery pack to the driver through the switch of the battery unit by referring to the information stored in the memory of each mounted battery unit, which are provided on the device main body side, and the charger may include means for reading at least the information about charge and discharge states of the storage battery pack stored in the memory of each battery unit, and means for writing into the memory at least the information about charge and discharge states of the storage battery pack in the same unit.

With these electric devices, a plurality of battery units can be detachably mounted thereon, and one or more battery units suitable for discharge can be selected based on the information about charge and discharge states of the storage battery packs stored in the memories provided in the battery units to allow them to discharge so as to supply electric power to the driving section.

Also in the case of charging the storage battery packs of the battery units, the charge can be selectively performed, while an optimal control is being conducted, for a single or a plurality of battery units by the charging apparatus provided on the device main body side, the charging apparatus provided in each battery unit, or the charging apparatus provided at a charger station based on the information about charge and discharge states of the storage battery packs stored in the storage apparatus in the battery units.

In these electric devices, the charger which is provided separately from the aforementioned battery unit can also be structured to be a unit attachable/detachable to/from the electric device main body, so that the charger (charger unit) can be detached, together with one or more battery units, from the electric device to charge the storage battery packs of the battery units.

Furthermore, it is desirable that the controller has means for reading the information about charge and discharge states of the storage battery pack stored in the memory of each battery unit and holding it therein, and means for controlling action of the whole device based on the information stored in the former means.

Moreover, it is possible that the memory of each battery unit also stores information about characteristics of the storage battery pack, and the charger has means for controlling charge of the storage battery pack, by referring to the information about the characteristics of the storage battery pack stored in the memory of each battery unit, in accordance with the characteristics.

Further, it is suitable that the controller has means for controlling discharge from the storage battery pack, by referring to the information about the characteristics of the storage battery pack stored in the memory of each battery unit, in accordance with the characteristics.

Further, in these electric devices, the controller desirably has means for displaying a remaining capacity of the storage battery pack of each battery unit based on the information stored each battery unit, and displaying a charge request and/or giving an alarm when a storage battery pack needing to be charged exists.

A method for charging and discharging the battery unit in the electric device according to the invention comprises the steps of discharging in order the storage battery packs of the battery units mounted on the electric device to a predetermined remaining capacity and then charging them, by referring to the information stored in the memories respectively.

Alternatively, it is preferable to discharge the storage battery packs of the battery units mounted on the electric device in decreasing order of remaining capacity, and to charge them in increasing order of remaining capacity, by referring to the information stored in the memories respectively.

Further, it is also preferable to discharge the storage battery packs of the battery units mounted on the electric device in increasing order of remaining capacity, and to charge them when the remaining capacities become a predetermined value or less, by referring to the information stored in the memories respectively.

Furthermore, it is also preferable to select one or more of battery units mounted on the electic device an discharge storage battery packs thereof, and to select remaining one or more battery units and charge storage battery packs thereof, by referring to the information stored in the memories respectively.

BRIEF DESCRIPTION OF DRAWINGS

FIG. 6 is a diagram showing a connecting state where charge is performed with a charger unit and a plurality of the battery units detached from the electric device shown in FIG. 3;

FIG. 9 is a flowchart showing an action by a controlling apparatus during operation of the electric device shown in FIG. 1;

FIG. 13 is a flowchart showing an action where the chargers in the battery units in the electric device shown in FIG. 2 send/receive information to each other to charge the storage battery packs while controlling charging power;

BEST MODE FOR CARRYING OUT THE INVENTION

Hereinafter, preferred embodiments of the invention will be described with reference to the drawings.

An electric device having a battery unit mounted thereon, an apparatus for charging the battery unit, and a method for charging and discharging the battery unit in the electric device according to the invention are explained in roughly divided three embodiments in order, in each of which the electric device including the above categories is mainly explained.

It should be noted that basically the electric device according to the invention is detachably equipped with a battery unit, in which a storage battery pack is always paired for integration with a memory for storing at least information about charge and discharge states of the storage battery pack (preferably including information about characteristic of the storage battery pack).

First Embodiment

Figure 1:
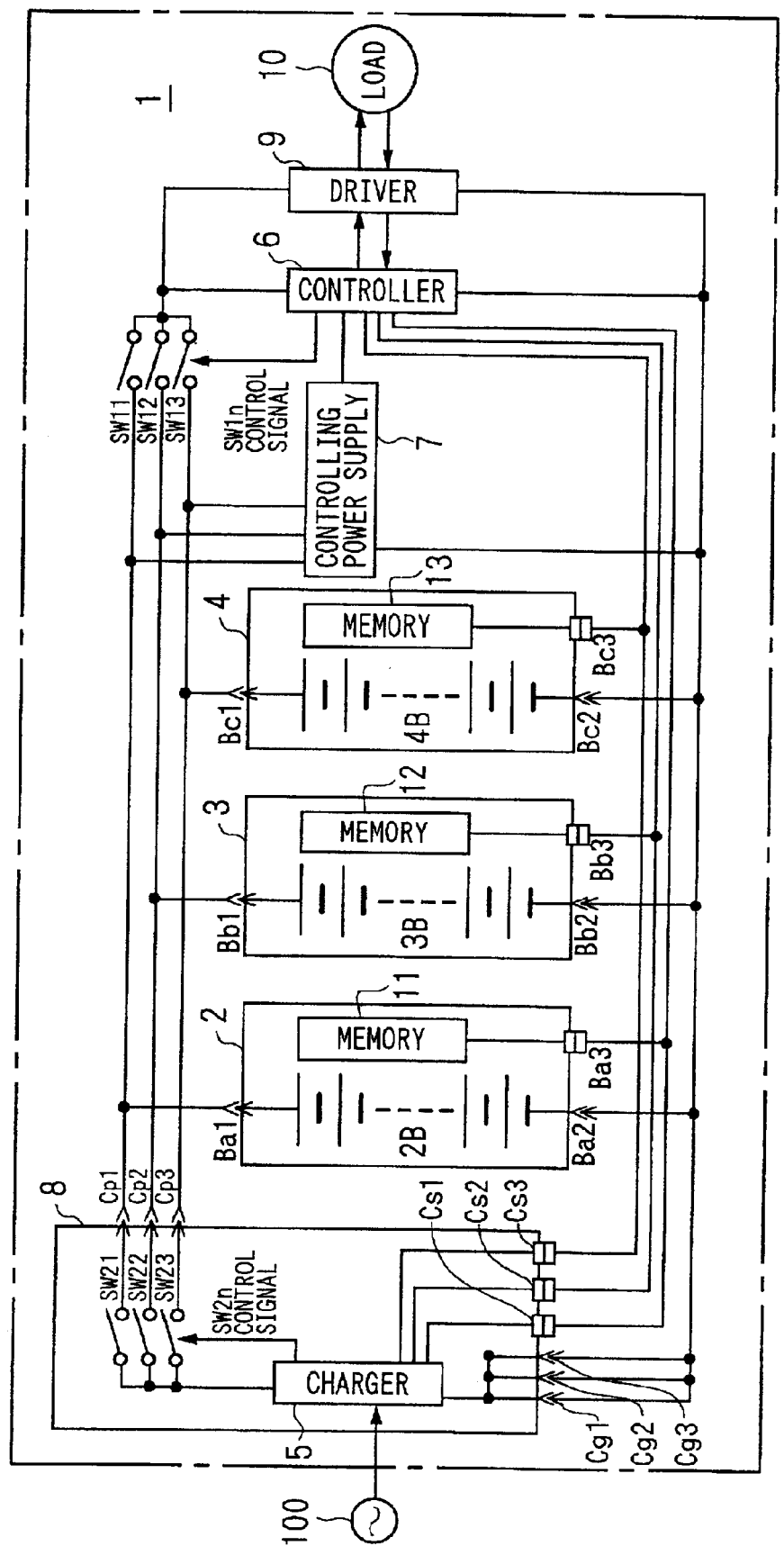
FIG. 1 is a block circuit diagram of an electric device showing a first embodiment of the invention on which battery units are mounted.

FIG. 1 is a block circuit diagram of an electric device showing the first embodiment of the invention on which battery units are mounted.

An electric device 1 of this embodiment has a plurality of battery units 2, 3 and 4, and a common charger unit 8 for charging respective storage battery packs 2B, 3B and 4B thereof, which are detachably mounted on the device main body (not shown) respectively.

The battery units 2, 3 and 4, having the same structure, are units in which the storage battery packs 2B, 3B and 4B are paired for integration with memories 11, 12 and 13 such as EEPROMs or the like. The battery units 2, 3 and 4 and battery unit installation sections (not shown) on the device main body are provided respectively with connectors Ba1, Ba2 and Ba3, connectors Bb1, Bb2 and Bb3, and connectors Bc1, Bc2 and Bc3, each of which is composed of paired terminals, as connecting means for electrically connecting and disconnecting the battery units 2, 3 and 4 to/from the device main body incident to attachment and detachment of the battery units 2, 3 and 4.

The charger unit 8 is a unit containing therein a charger 5 having a microcomputer and switches SW21, SW22 and SW23 corresponding to each of the battery units 2, 3 and 4, and is provided with connectors Cp1, Cp2, Cp3, Cg1, Cg2, Cg3, Cs1, Cs2 and Cs3, each of which is composed of paired terminals, between the charger unit 8 and the charger unit installation sections (not shown) of the device main body, as connecting means for electrically connecting and disconnecting the charger unit 8 to/from the device main body side incident to attachment and detachment of the charger unit 8.

Further, the electric device 1 comprises, on the main body side, a controller 6 for controlling the action of the whole electric device 1, a controlling power supply 7 and a driver 9 connected thereto, a load 10 of the electric motor and the like which is driven by the driver 9 to drive a running section (not shown), and three switches SW11, SW12 and SW13 interposed in discharge (feed) lines from the battery units 2, 3 and 4 to the controller 6 and the driver 9.

The charger 5 in the charger unit 8 has a function of charge controlling the storage battery packs 2B, 3B and 4B of the battery units 2, 3 and 4, and a function of reading and writing information from/into the memories 11, 12 and 13. Further, the controller 6 similarly has therein a function of reading and writing information from/into the memories 11, 12 and 13 of the battery units 2, 3 and 4 in addition to a function of controlling all signals.

The charger 5 receives supply of alternating-current power from a commercial power supply 100, rectifies and smoothes it to make it direct current, and converts it to an output voltage suitable for charge. Further, the charger 5 reads and temporarily stores the information about the charge and discharge states of the storage battery packs 2B, 3B and 4B from the memories 11, 12 and 13 of the plurality of the mounted battery units 2, 3 and 4, and selectively turns on one of the switches SW21, SW22 and SW23 by a switch $2n$ control signal to charge the storage battery pack of the battery unit selected based on the information.

FIG. 1 shows an example in which three battery units are mounted, but the object of the invention can be achieved by mounting two or more battery units. In addition, the charger unit 8 is also detachably mounted on the main body of the electric device 1, so that it can easily be detached from the electric device 1 and used outside the electric device 1, but it may be provided fixedly to the main body of the electric device 1.

Each of the storage battery packs 2B, 3B and 4B of the battery units 2, 3 and 4 is constituted by connecting in series a plurality of chargeable storage batteries or secondary batteries.

In each of the memories 11, 12 and 13 of the battery units 2, 3 and 4, information specific to a battery such as a rated capacity, temperature characteristics, preservation characteristics and the like, and information about the charge and discharge states of the battery, such as an amount of charge, an amount of discharge, numbers of charges and discharges and the like of each of the storage battery packs 2B, 3B and 4B, are stored.

As described above, the battery units 2, 3 and 4 have individual information respectively, which allows the plurality of the battery units 2, 3 and 4 to be attached and detached in any order. The switches SW11, SW12 and SW13 which are provided in respective feed lines between the battery units 2, 3 and 4, and, the controller 6 and the driver 9, are selectively turned ON by an SW1$n$ control signal controlled based on the controlling function of the controller 6, and used for selecting which battery unit is used to feed power to the controller 6 and the driver 9.

The controller 6, having a microcomputer therein, detects installation states of the plurality of the battery units 2, 3 and 4 by the controlling function in conjunction with the reading/writing function, reads and temporarily stores the information stored in the memories 11, 12 and 13 in the battery units 2, 3 and 4, selects a battery unit to be discharged based on the information, and controls its discharging current, discharging voltage and the like, to thereby conduct management appropriate for the battery characteristics of the battery unit used and the characteristics of the electric device 1 when necessary.

Figure 21:
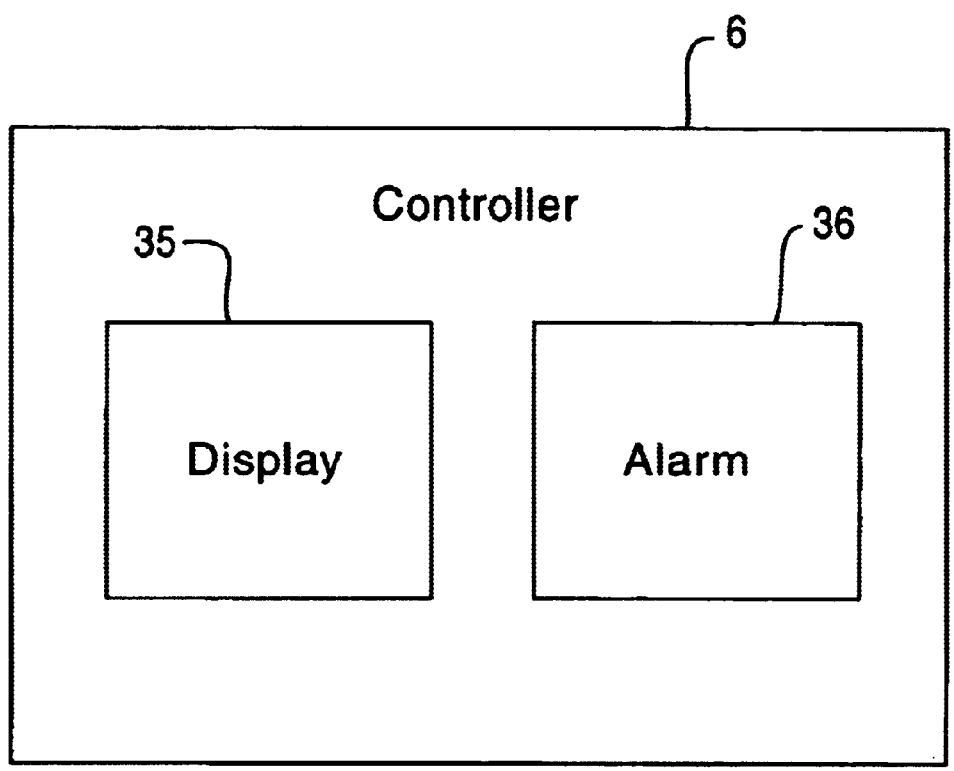
FIG. 21 is a diagram showing a controller with a display and an alarm.

Further, it is also possible to display, for example, on a display 35 (FIG. 21), information of each of the mounted battery units, for example, the remaining battery capacity of the individual or the total of the plurality of the mounted battery units, charge request when there is a battery unit needing to be charged and the like, or to give an alarm and the like, for example, using an alarm 36 (FIG. 21), when necessary. In other words, this controller 6 has functions of controlling ON/OFF states of the switches SW11, SW12 and SW13 and managing and controlling the whole electric device 1, based on the information stored in the memories 11, 12 and 13 of the battery units 2, 3 and 4.

The controlling power supply 7 has a function of supplying required power to the controller 6 when at least one of the battery units 2, 3 and 4 is mounted on the electric device 1. The controlling power supply 7 is supplied with electric power also when at least one storage battery pack among the battery units is charged by the charger 5, and in this event the controlling power supply 7 operates when necessary to supply electric power to the controller 6.

Further, when each of the battery units 2, 3 and 4 is detached or when a command to stop the electric device 1 is given or the like, the controlling power supply 7 supplies electric power to the controller 6 until the controller 6 stops drive of the load 10 by the driver 9, writes information about charge and discharge states and the like of the storage battery packs of an operating battery unit among the battery units 2, 3 and 4 into the memory in the battery unit, stops the electric device 1 in safety, and the like, to thereby complete necessary processing.

The driver 9 receives supply of electric power from single or combination, as required, of the plurality of the battery units 2, 3 and 4 mounted on the electric device 1, to drive and control the load 10 such as an electric motor, an actuator, a group of lamps and the like.

The electric motor of the load 10 drives a not shown running section such as wheels to thereby cause the electric device 1 to run. The actuator operates a brake and the like. The group of lamps includes lamps such as a headlight, a taillight, blinkers (winkers).

Moreover, when it is necessary to detect a charging current and a discharging current in accordance with purposes, accurate information about the charging current and/or the discharging current can be obtained by providing, for example, current detectors, not shown, at points in connection lines from the connectors Ba2, Bb2 and Bc2 to the battery units 2, 3 and 4 where charge and discharge can be detected.

In the same manner, an accurate voltage or temperature information of each of the storage battery packs 2B, 3B and 4B in the battery units 2, 3 and 4 can be obtained by providing a voltage detector for detecting the voltage of a plurality of individual battery cells or the whole cell block, or a temperature detector for detecting temperature of the individual battery cell or the whole cell block, in accordance with characteristics of the storage battery pack used in each of the battery units 2, 3 and 4. Since these detectors are also configured to be detachably attached to the device main body together with the respective battery units 2, 3 and 4, they need connectors for their signal lines.

Next, charge action for the battery units 2, 3 and 4 in the electric device 1 shown in FIG. 1 is explained.

When the charger 5 in the charger unit 8 is supplied with the commercial power supply 100 or an alternative power supply to go into the charge action, the microcomputer in the charger 5 first accesses each of the memories 11, 12 and 13 in the plurality of the battery units 2, 3 and 4 to detect the existence or absence of the installation thereof, and reads and obtains the information stored in the memories of the installed battery units, and holds the obtained information in the memory included in the charger 5 if necessary. This allows the charger 5 to recognize the information about the charge and discharge states and the like of the storage battery packs 2B, 3B and 4B in the battery units 2, 3 and 4 installed in the electric device 1. The charger 5 selects, for example, a battery unit for which charge will be completed the earliest based on the recognized information of each of the battery units 2, 3 and 4, and turns on any one of the switches SW21 to SW23 by the SW2$n$ control signal, to go into charge action for the storage battery pack of the selected battery unit.

After the completion of the charge of the battery unit, the charger 5 writes charge information such as increase in the number of charges, full charge information, the integrated charge amount, temperature in charging, and the like into the memory of the battery unit for which the charge has been completed, and then starts charging a battery unit needing to be charged next. The charger 5 conducts the charge until battery units needing to be charged no longer exist among the plurality of the mounted battery units, and when the charge is completed, the charger 5 ends the charge action.

Further, even when the charge action is suspended at some midpoint of the charge because of some reasons, the charge information until the midpoint is stored in the memory provided in the battery unit in charging as in the case of the completion of the charge, so that the above information can be utilized at the time of charging and discharging the battery unit. The above-described charge action is explained using flowcharts in FIG. 7 and FIG. 8.

Figure 7:
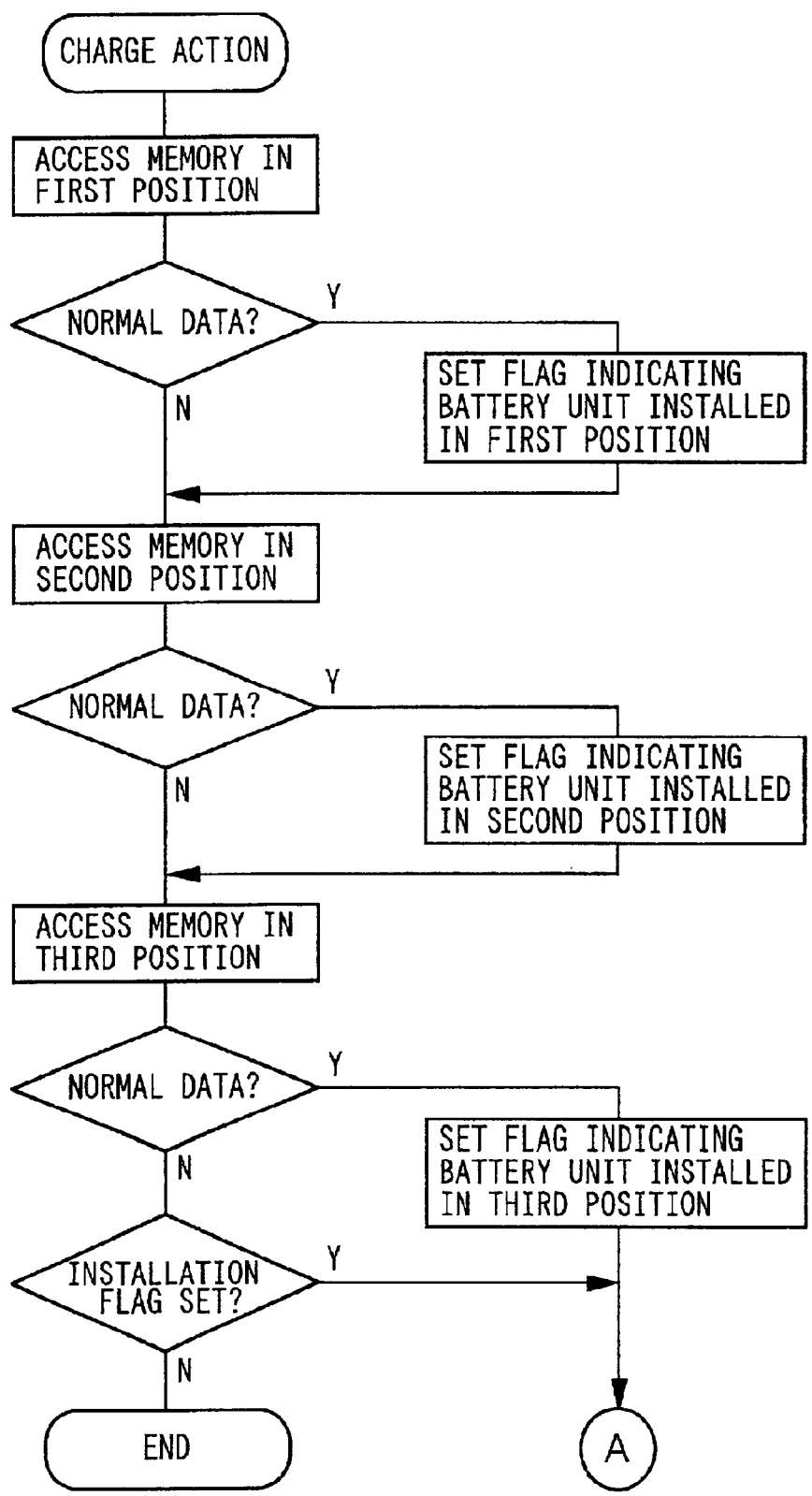
FIG. 7 is a flowchart showing a charge action for the battery units by a charger in the electric device shown in FIG. 1.
Figure 8:
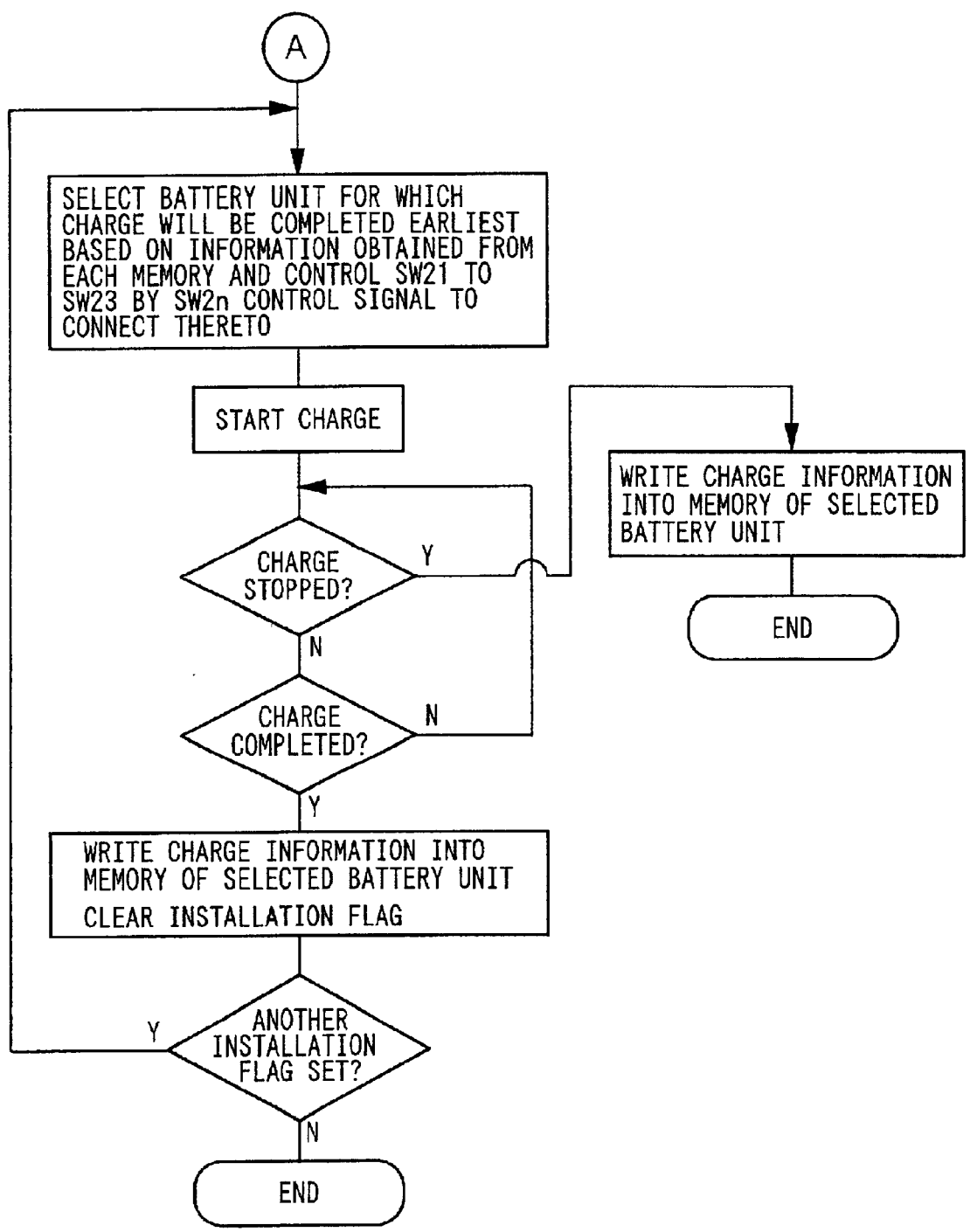
FIG. 8 is a subsequent flowchart of the same.

When the charger 5 in the charger unit 8 in FIG. 1 goes into the charge action shown in the flowcharts in FIG. 7 and FIG. 8, it first accesses a storage in a battery unit installed in a first position (the memory 11 in the battery unit 2 in this example) as shown in FIG. 7 to read the information (data) stored therein.

Then, the charger 5 determines whether the data is normal or not. The circuit is configured to erase data to zero when no battery unit is installed. In this case, it is appropriate, for example, to provide checksum data and to use means for checking it.

If the result of the determination whether the data is normal or not is normal (Y), the charger sets a flag indicating that the battery unit is installed in the first position, and if the result is abnormal (N), the charger 5 performs nothing, and then it accesses a storage in a second position (the memory 12 in the battery unit 3 in this example) to read the information (data) stored therein.

Subsequently, the charger 5 determines whether the data is normal or not, and if it is normal (Y), the charger 5 sets a flag indicating that the battery unit is installed in the second position, and if it is abnormal (N), the charger 5 performs nothing, and then it accesses a storage in a third position (the memory 13 in the battery unit 4 in this example) to read the information (data) stored therein.

Subsequently, the charger 5 determines whether the data is normal or not, and if it is normal (Y), the charger 5 sets a flag indicating that the battery unit is installed in the third position, and then it proceeds to process of charge shown in FIG. 8.

When the result of the determination whether the data is normal or not is abnormal (N), the charger 5 checks whether the installation flag is set or not, and if it is set, the setting of the installation flag indicates that the battery units are installed in the first and/or second positions, and thus the charger 5 proceeds to the process of charge shown in FIG. 8. If it is not set, the charger 5 determines that no battery units are installed in the installation positions, and ends the charge action here.

According to the start of the charge action shown in FIG. 8, when there are a plurality of installation flags for the battery units, the charger 5 selects, for example, the battery unit for which charge will be completed the earliest based on the information obtained from each memory. (information about charge and discharge states of the storage battery pack), controls the switches SW21, SW22 and SW23 in the charger unit 8 shown in FIG. 1 by the SW2$n$ control signal to connect to the battery unit. Thereby, the charger 5 starts charging the storage battery pack of the selected battery unit.

After the start of the charge, in a typical charging method, the charge is continued to be performed to full charge where the charge is completed unless a charge stop command (command based on turning off of the commercial power supply, charge stop operation from an operating panel (not shown), or the like) to suspend the charge at some midpoint is given. When a charge stop command is given at some midpoint, however, the charger 5 writes the charge information about charging until then into the memory in the battery unit which has been selected and charged, and ends the charge action.

On the other hand, after the charger 5 starts charging the storage battery pack of the selected battery unit, it measures and computes the charge information such as the integrated charge amount, the temperature in charging, and the like which are previously decided as necessary in accordance with the battery characteristics of the selected battery unit, during the charge, by the charge controlling function thereof by a predetermined method, and holds it by the memory in the charger unit 8.

After the completion of the charge of the selected battery unit, the charger 5 writes the charge information into the memory of the selected battery unit. Subsequently, the charger 5 clears the installation flag for the battery unit.

Thereafter, the charger 5 determines whether another installation flag is set or not, and if it is not set (if it is cleared), the charger 5 ends the charge action. However, when the installation flag is still set (when it is not cleared), the charger 5 returns to the first step in FIG. 8 and repeats the above described processing, that is, it selects a battery unit for which charge will be completed the earliest among the remaining battery units (a battery unit subjected to charge second) and starts charging it. Subsequent processing is the same as performed for the battery unit which has been charged first.

After the completion of the charge of the battery unit, when the installation flag for still another battery unit is set, the charger 5 repeats the same action to thereby complete charge of all of the storage battery packs of the battery units.

Naturally, when charge is not necessary for the storage battery pack in accordance with the information from the memory of each battery unit, the charger 5 does not go into the charge action but clears only the installation flag to thereby end the processing for the battery unit to be processed. This prevents an excessive charge due to recharge into the storage battery pack of the battery unit just after charge or in a fully charged state, which does not need to be charged.

The information here to be stored in the memories 11, 12 and 13 provided in the respective battery units 2, 3 and 4 includes information about the charge and discharge states required in accordance with characteristics of the batteries in use (the storage battery packs 2B, 3B and 4B) and characteristics of the electric device 1, for example, the number of charges, full charge information, an integrated charge amount, temperature in charging, the number of discharges, an integrated discharge amount, a remaining capacity, temperature in discharging, and the like. The details of the information will be described below.

Next, the action of the electric device 1 (driving of the load 10) shown in FIG. 1 during operation is explained.

When the battery unit is installed in at least one of three battery unit installation sections in the electric device 1, required power is supplied to the controller 6 by the controlling power supply 7.

When the controller 6 is supplied with the power supply, it accesses the memories 11, 12 and 13 provided in the battery units 2, 3 and 4 by the controlling function included in the controller 6, so that the controller 6 obtains information of the existence or absence of the installation of the battery units and the information in the memories necessary for discharge from the installed battery units, and holds them when necessary by the information storing function included in the controller 6.

Through this action, the battery units installed in the electric device 1 are recognized as in the case by the aforementioned charger 5. Though illustration is omitted, when a signal requesting operation of the electric device 1 is inputted into the controller 6, it selects, for example, a battery unit having the least remaining capacity, based on the above-described information necessary for the discharge, which the controller 6 has obtained and holds. Actually, a battery unit to be discharged is selected in accordance with the characteristics of the storage battery pack, the characteristics of the electric device, and the like, and in this embodiment, an example is explained in which the battery unit having the least remaining capacity is selected.

The controller 6 switches the switches SW11, SW12 and SW13 by the SW1n control signal and sends a signal to the driver 9 in response to the aforementioned request to cause the driver 9 to drive, for example, an electric motor (not shown) which is the load 10 to thereby operate the electric device.

When the battery unit, which has been selected and being discharged, comes into a predetermined end-of-discharge state, the controller 6 writes the discharge information into the memory of the battery unit. Then, the controller 6 selects a battery unit to be discharged next based on the information from the memories of other installed battery units or the information which has been obtained and stored, and switches between the switches SW11, SW12 and SW13 to connect the selected battery unit and disconnect the discharged battery unit in the same manner as described above.

Further, the discharge information is written into the memory of the battery unit in use even when the request for operation of the electric device 1 by the driver 9 disappears at some midpoint of the discharge.

Figure 10:
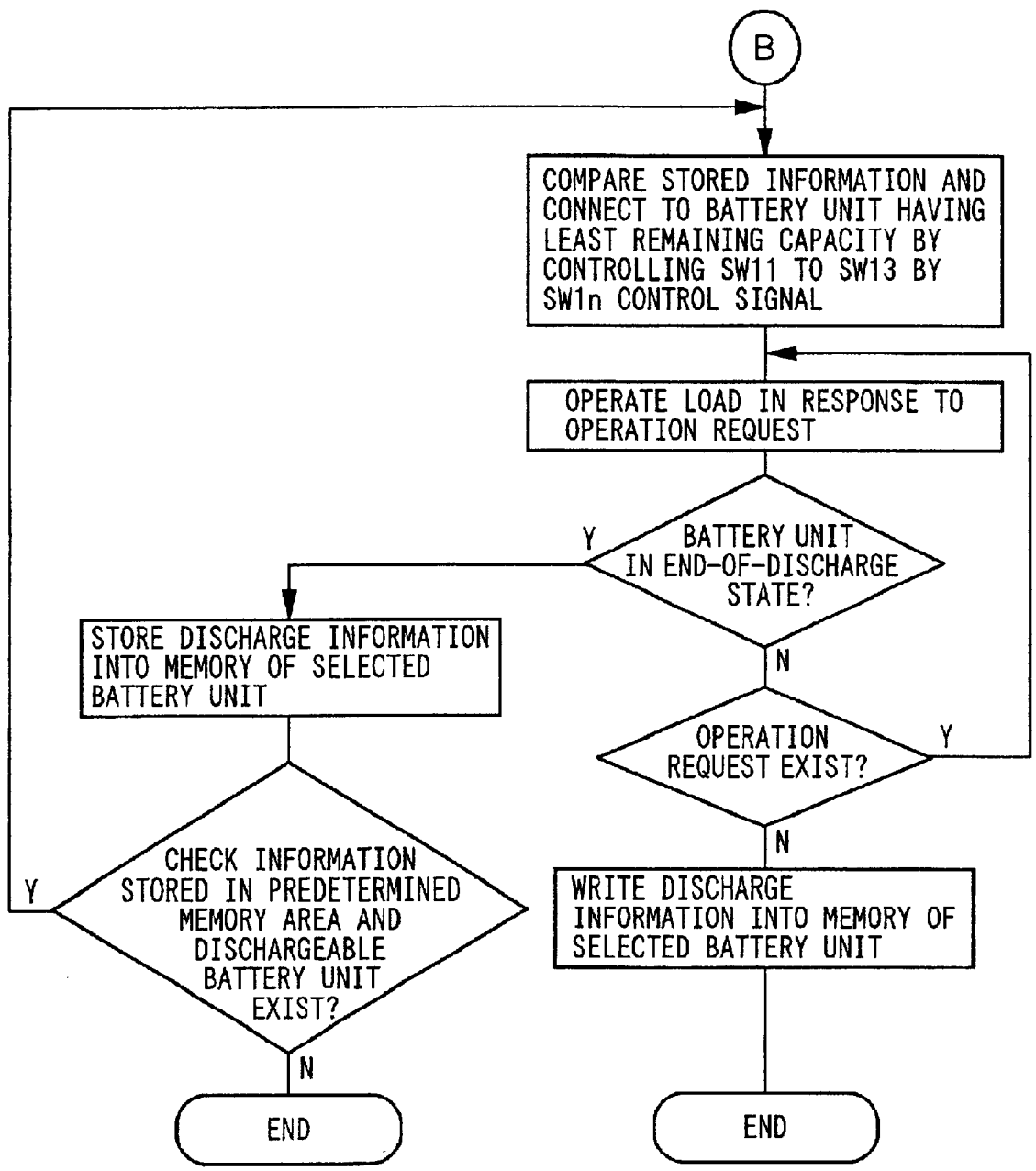
FIG. 10 is a subsequent flowchart of the same.

The action during operation of the electric device is explained in accordance with flowcharts in FIG. 9 and FIG. 10.

The controller 6 in FIG. 1 determines the existence or absence of the request for operation of the electric device in the first step shown in FIG. 9, and if no operation request exists, it waits, and if exists, it immediately proceeds to the next step to access the memory in the first position (the memory 11 of the battery unit 2 in the example of FIG. 1) to read its information. Then, the controller 6 determines whether the information is normal data (information) or not.

As a result, if the data is normal (Y), the controller 6 stores in a predetermined memory area the information in the first memory. Also in this case, the controller 6 may set an installation flag in the same manner as described above in the charge action, and access the memory of the battery unit every time the controller 6 needs the information in the memory.

The controller 6 accesses, immediately when the result of the above determination is abnormal (N) and after performing the above-described processing when the result is normal (Y), the memory in the second position (the memory 12 of the battery unit 3 in the example in FIG. 1) to read its information. Then, the controller 6 determines whether the information is normal data (information) or not.

The controller 6 accesses, immediately when the result of the above determination is abnormal (N) and after storing in a predetermined memory area the information in the second memory when the result is normal (Y), the memory in the third position (the memory 13 of the battery unit 4 in the example in FIG. 1) to read its information. Then, the controller 6 determines whether the information is normal data (information) or not.

When the result of the above determination is normal (Y), the controller 6 stores in a predetermined memory area the information in the third memory and then proceeds to operation processing shown in FIG. 10.

When the result of the above determination is abnormal (N), the controller 6 determines whether stored information exists in the predetermined memory area or not, and when the information exits, the controller 6 proceeds to the operation processing shown in FIG. 10, and when no information exists, it determines that no battery units are installed in the first to third installation positions and ends this processing here.

In the processing in the first step in FIG. 10, the controller 6 compares the contents of the information stored in the predetermined memory areas, for example, selecting a battery unit having the least remaining capacity, and controls the switches SW11, SW12 and SW13 by the SW1n control signal to connect the selected battery unit to the controller 6 and the driver 9.

Then, the controller 6 allows the storage battery pack in the selected battery unit to discharge to thereby supply power to and drive the load 10 in response to the operation request to operate the electric device 1. While the remaining capacity of the storage battery pack of the battery unit exists and the operation request is continued, the battery unit keeps discharging. When the operation request disappears, the controller 6 writes the discharge information until then into the memory of the selected battery unit and then ends the processing.

Once the controller 6 selects a battery unit to allow it to start discharging, the controller 6 measures and calculates an integrated discharge amount, temperature in discharging and the like which are previously decided as necessary in accordance with the battery characteristics and the electric device characteristics, during the discharge, by the controlling function thereof by a predetermined method, and holds them by the information storing function of the controller 6. Further, the controller 6 writes them into the memory of the selected battery unit as required.

On the other hand, when the selected battery unit comes into an end-of-discharge state at some midpoint while the operation request is continued, the controller 6 writes the discharge information until then into the memory of the selected battery unit and other memories if necessary, for example, the memory for use in the information storing function included in the controller 6.

Subsequently, the controller 6 checks the information stored in the above-described predetermined memory area to determine whether another dischargeable battery unit exists or not. In the case of "NO", the controller 6 ends the processing, but in the case of "YES", the controller 6 returns to the first step in FIG. 10 to repeat the above-described processing, in which the controller 6 selects the battery unit having the next less remaining capacity among the other installed battery units to allow it to discharge to drive the load during the exist of the operation request.

Figure 4:
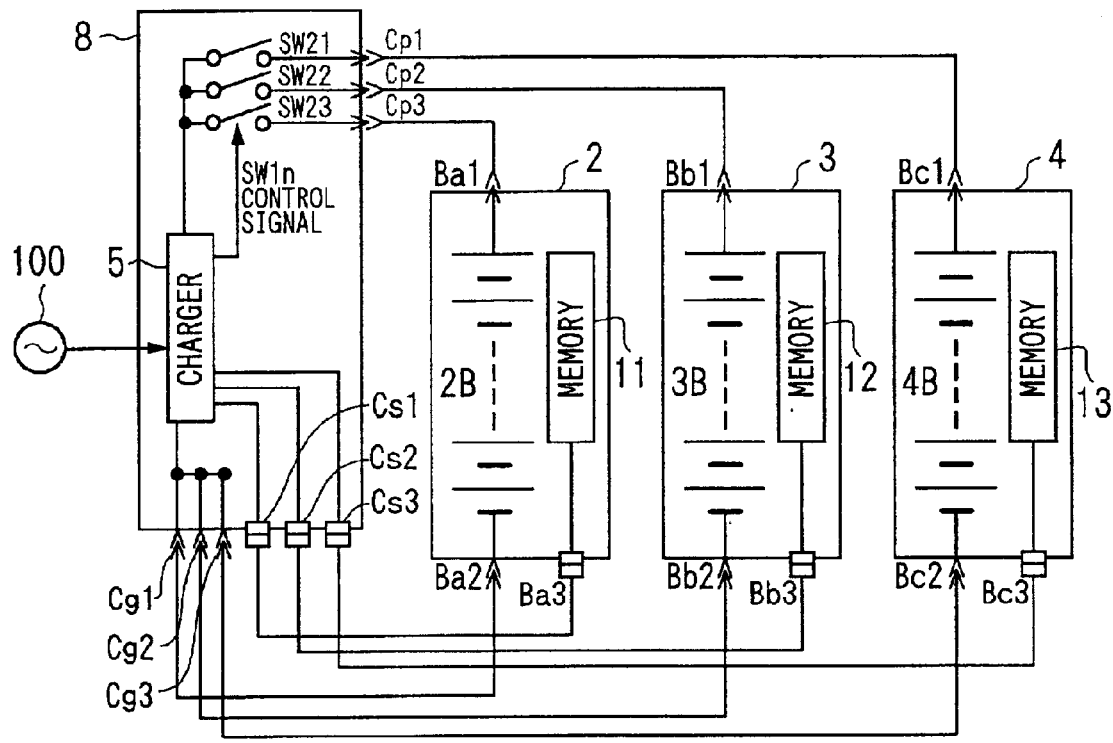
FIG. 4 is a diagram showing a connecting state where charge is performed with a charger unit and a plurality of the battery units detached from the electric device shown in FIG. 1.

FIG. 4 is a diagram showing a connecting state when the charger unit 8 and the plurality of battery units 2, 3 and 4 are detached from the electric device 1 shown in FIG. 1 to be charged, and the charge action thereof is the same as the above-described charge action where they are installed in the electric device 1.

In this example, a state is shown in which the charger unit 8 and three sets of battery units 2, 3 and 4 are detached from the electric device 1 at the same time to be charged, but it is not necessary to detach and charge at the same time all of the plurality of battery units mounted on the electric device 1.

For example, only the completely discharged battery unit or the battery unit having a storage battery pack having a little remaining capacity among the plurality of the battery units mounted on the electric device 1 is detached together with the charger unit 8 and charged, which makes it possible to operate the load 10 in response to an operation request by using the remaining battery units until the former battery unit is mounted again.

In the case where the charger unit 8 is fixedly provided in the electric device 1 or the battery units are charged while mounted on the electric device, since the charger unit 8 needs to be connected to the commercial power supply 100, the electric device 1 itself should be stopped at a place where it can be connected to the commercial power supply 100, and thus the electric device 1 can not be used during the charge. Accordingly, the charge should be performed during hours when the electric device is not in use such as during the night.

As in this embodiment, however, each of the charger unit 8 and the battery units 2, 3 and 4 is detachably mounted on the main body of the electric device 1, and only the charger unit 8 and a battery unit needing to be charged are detached from the electric device 1 and charged, which eliminates the need to connect the electric device 1 to the commercial power supply, the load can be driven by using the remaining battery units also during the charge as described above for free running.

It is preferable to prepare the charger unit 8, and a charging holder provided with a charger unit installation section and battery unit installation sections in an integral manner, not shown, in which the charger unit 8 and one or more battery units can be detachably installed, and provided with a connecting cord to the commercial power supply; and to provide, respectively in the charger unit installation section and the battery unit installation sections, fixed terminals (connected to respective corresponding terminals of the charger unit 8 and the battery unit 2 and the like), which form respective connectors for establishing electrical connection to the charger unit 8 and the battery unit 2 and the like.

As a result, only by connecting the connecting cord of the charging holder to the commercial power supply, installing the charger unit 8 in the charger unit installation section, and installing battery units desired to be charged in the battery unit installation sections, all the connections between the connectors of the charger unit 8 and the installed battery units are completed, which allows charge to be started immediately.

The charger unit 8 and the charging holder can constitute the charging apparatus according to the invention. In the case of the charging apparatus which is not mounted on the electric device, the charger unit 8 and the charging holder can be integrated to constitute the charging apparatus.

Second Embodiment

Figure 2:
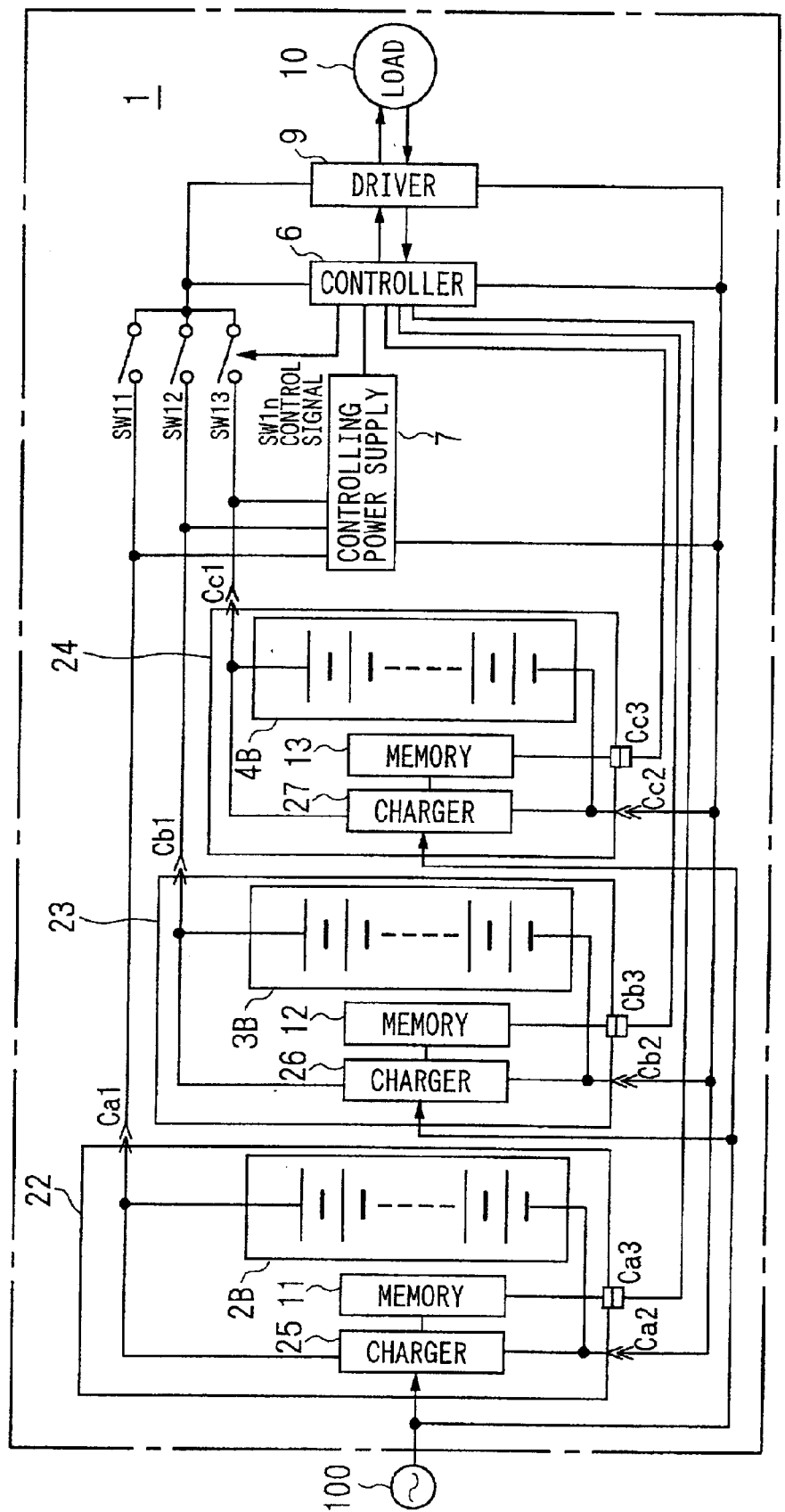
FIG. 2 is a block circuit diagram of an electric device showing a second embodiment of the invention on which battery units are mounted.

FIG. 2 is a block circuit diagram of an electric device showing a second embodiment of the invention on which battery units, are mounted, in which the same portions as those in FIG. 1 are assigned the same numerals and the description thereof is omitted or simplified.

Battery units 22, 23 and 24 of the second embodiment include therein respectively, as in the battery units of the first embodiment, storage battery packs 2B, 3B and 4B paired for integration with memories 11, 12 and 13 for storing information about charge and discharge states thereof, and chargers 25, 26 and 27 which are the same as the charger 5 provided in the charger unit 8 in FIG. 1. Therefore, the battery units 22, 23 and 24 can be referred to as power supply units.

Each of these battery units 22, 23 and 24 is detachably mounted on the main body of an electric device 1. The battery units 22, 23 and 24 and battery unit installation sections (not shown) on the device main body are provided with connectors Ca1, Ca2 and Ca3, connectors Cb1, Cb2 and Cb3, and connectors Cc1, Cc2 and Cc3, each of which is composed of paired terminals, as connecting means for performing electrical connection and disconnection to/from the device main body respectively incident to attachment and detachment of the battery units 22, 23 and 24.

On the electric device 1 of this embodiment, the charger unit 8 in FIG. 1 is not mounted because the plurality of the battery units 22, 23 and 24, which include therein chargers respectively are mounted. The other configuration, that is, a controller 6, a controlling power supply 7, a driver 9 for driving a load 10 such as an electric motor or the like in response to a request from the controllers, and three switches SW11, SW12 and SW13 for switching the battery units for discharge (feed) by an SW1$n$ control signal from the controller 6 are provided, is the same as in the first embodiment.

The chargers 25, 26 and 27 of the battery units 22, 23 and 24 are directly connected to a commercial power supply 100 respectively, and configured to charge the respective storage battery packs 2B, 3B and 4B in the same units referring to information stored in the respective memories 11, 12 and 13 in the same units. While an example in which three sets of battery units are mounted is shown, two or more sets are preferably mounted.

Next, charge action in the electric device of this embodiment is explained.

When the chargers 25, 26 and 27 of the plurality of the battery units 22, 23 and 24 are supplied with the commercial power supply 100 or an alternative power supply, they go into the charge action.

Each of the battery units 22, 23 and 24 first accesses the memory 11, 12 or 13 in the same unit, reads and obtains the information stored in the storage battery pack 2B, 3B or 4B needing to be charged, and starts charging the storage battery pack when it determines that the storage battery pack in the same unit needs to be charged. When the storage battery pack is fully charged, the battery unit 22, 23 or 24 writes the charge information into the memory in the same unit and ends the charge action.

When the charge action is stopped at some midpoint of the charge, the battery unit 22, 23 or 24 writes the charge information until then into the memory in the same unit in the same manner as in the case of completion of the charge to utilize it for later charge and discharge.

The above-described charge action is one example in which the plurality of the battery units 22, 23 and 24 separately perform charge action. However, when the plurality of the battery units perform charge action simultaneously, electric power is increasingly demanded of the commercial power supply 100 or the alternative power supply, which may produce a disadvantage that a breaker stack trips in the case of, for example, a household power supply.

As means for solving the above problem, as will be described below with reference to FIG. 12, control can be conducted such that the chargers 25, 26 and 27 included in the respective battery units 22, 23 and 24 are connected to each other by not shown connectors and signal lines, and the chargers 25, 26 and 27 send/receive information each other through an information exchange route by the signal lines to determine an order of charging the storage battery packs 2B, 3B and 4B for sequential charge.

It is possible to cope with the above disadvantage, in accordance with the contents of the information stored in the memories 11, 12 and 13, by preparing a required commercial power supply or an alternative power supply, by performing the sequential charge with the power demand being made appropriate to the power capacity of the commercial power supply or the alternative power supply, or by controlling amounts of charge of the plurality of the storage battery packs 2B, 3B and 4B.

On the other hand, since the storage battery packs 2B, 3B and 4B are connected to the chargers 25, 26 and 27 respectively all the time in the battery units 22, 23 and 24 in this embodiment, it is necessary to interpose, for example, diodes, reverse current preventing circuits, or the like, not shown, between the storage battery packs and the chargers to prevent a current from reversely flowing from the storage battery packs 2B, 3B and 4B to the charger units 25, 26 and 27.

Figure 11:
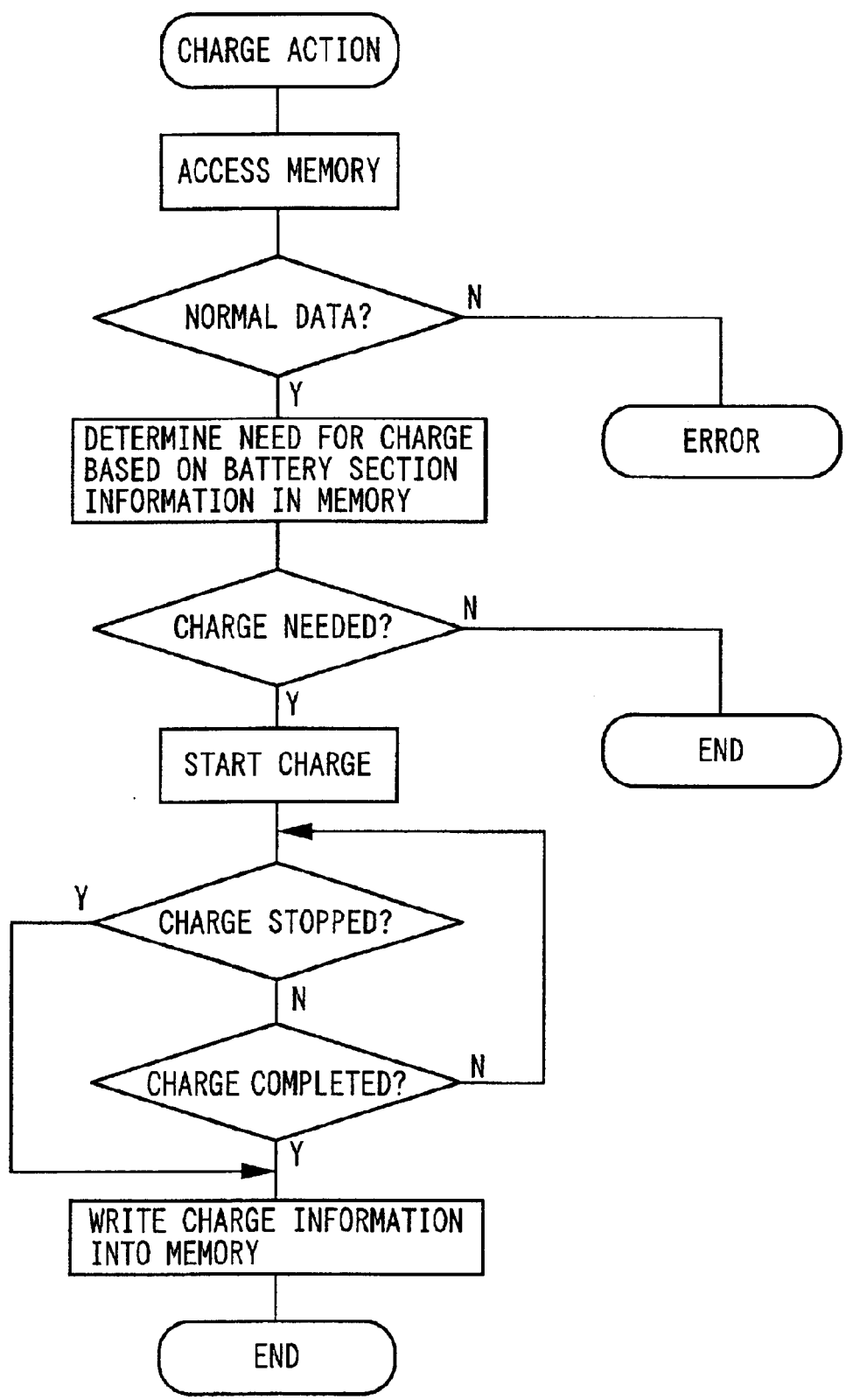
FIG. 11 is a flowchart showing an individual charge action by the charger of each battery unit in the electric device shown in FIG. 2.
Figure 12:
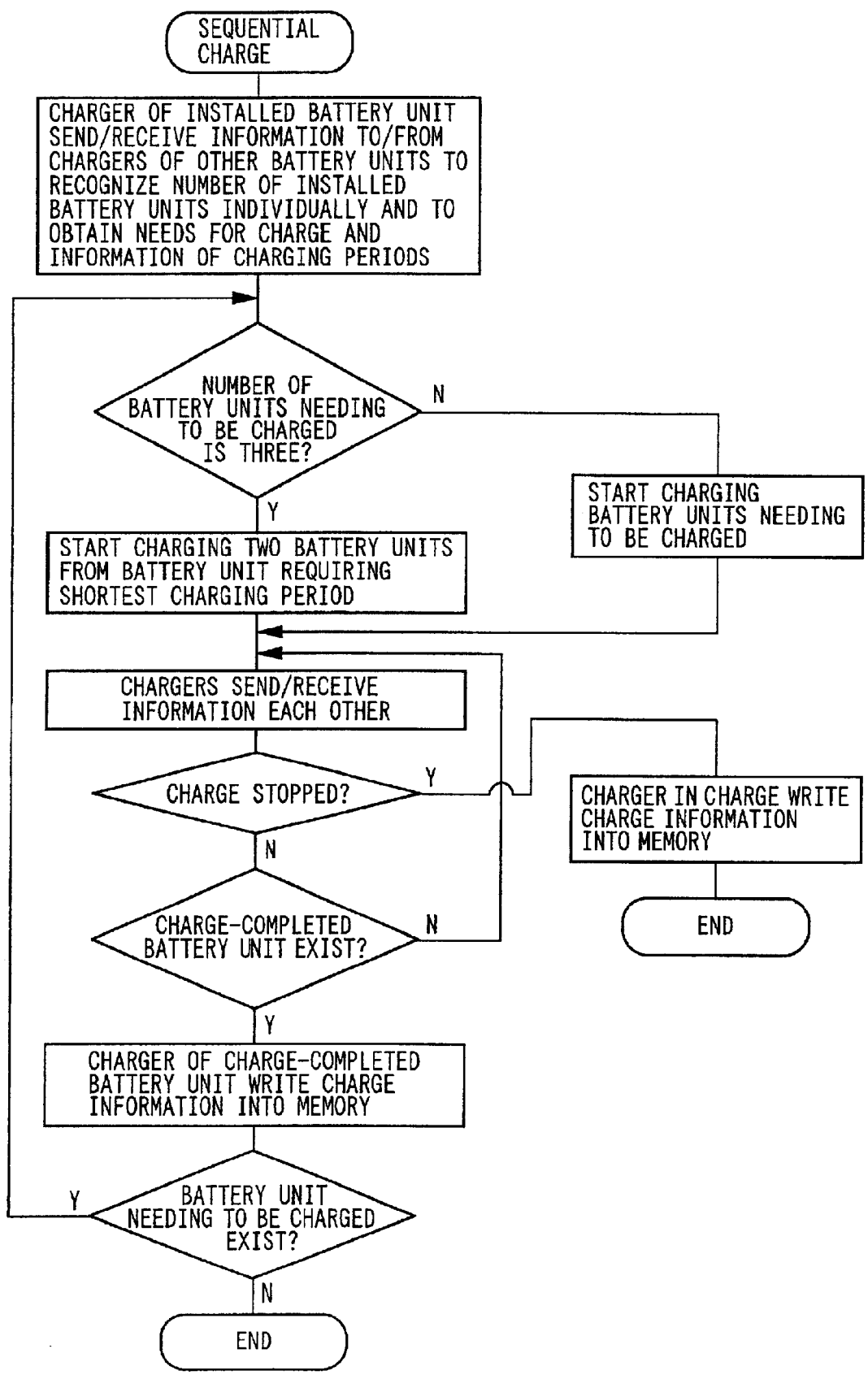
FIG. 12 is a flowchart showing an action where the chargers in the battery units in the electric device shown in FIG. 2 send/receive information each other to sequentially charge storage battery packs.

Next, the above-described charge action in this electric device is explained in more detail using flowcharts in FIG. 11 and FIG. 12.

The charge action in accordance with the flowchart in FIG. 11 is the case in which the chargers 25, 26 and 27 in the respective battery units 22, 23 and 24 shown in FIG. 2 separately perform charge action.

When the chargers 25, 26 and 27 of the battery units 22, 23 and 24 are supplied with the commercial power supply 100 or the alternative power supply, the respective chargers 25, 26 and 27 go into the charge action shown in the flowchart in FIG. 11. While the same action is performed in any battery unit, the case of the battery unit 22 is explained below.

In the battery unit 22, the charger 25 first accesses the memory 11 and determines whether its data is normal or not. When the data is normal, the charger 25 determines the need to charge the storage battery pack 2B based on the information obtained from the memory 11. Then, when the charger 25 determines that the charge is necessary, it starts charging the storage battery pack 2B. After the start of the charge, the charger 25 continues the charge unless a command to stop the charge is given, and determines whether the charge has been completed or not, and when it has been completed, the charger 25 writes the charge information at that time into the memory 11 and ends the charge action.

After the start of the charge, the result of the access to the memory 11 is not normal data, which is regarded as "error", the charger 25 does not perform the charge action. In this case, the charger 25 goes into the charge action again after taking measures, such as seeking a cause. When the result of the charger 25 determining the need to charge the storage battery pack 2B based on the information obtained from the memory is that charge is unnecessary, the charger 25 ends the charge action there.

On the other hand, when a charge stop command is given after the start of the charge, the charger 25 writes the charge information until then into the memory 11 even in charging and ends the charge action.

However, if the above-described charge action is performed in the plurality of the battery units simultaneously, demanded power is excessively increased as has been explained, which may trip a breaker stack provided along the feed lines to the commercial power supply 100.

In order to prevent occurrence of the above disadvantage, it is preferable to perform the sequential charge shown in the flowchart in FIG. 12.

In this case, a route through which information is sent/received is provided among the chargers 25, 26 and 27 of the battery units 22, 23 and 24 mounted on the electric device 1 shown in FIG. 2. This makes it possible for the respective chargers 25, 26 and 27 to arbitrarily decide an order of charging the storage battery packs 2B, 3B and 4B by exchanging the information obtained from the memories 11, 12 and 13, respectively.

For example, there is a method of obtaining required amounts of charge from the remaining capacities of the storage battery packs based on the information obtained from the memories and converting them to time to calculate required charging periods, and charging the storage battery packs in order from the battery unit having the storage battery pack requiring a shorter charging period. There is also a method of charging the storage battery packs in order from the storage battery, pack having a less capacity (most discharged), or a method of charging the storage battery packs of the battery units in a predetermined order regardless of the magnitude of the remaining capacities. Further, there is a method of sequentially charging them from the storage battery pack having a larger charge capacity per unit time, and the like.

In the example shown in the flowchart in FIG. 12, in the first step, the charger 25, 26 or 27 of the installed battery unit 22, 23 or 24 sends/receives information to/from the chargers of other battery units to recognize the number of installed battery units individually and to obtain needs for charge and information of charging periods.

Then, the chargers 25, 26 and 27 determine the number of battery units needing to be charged. As the result of the determination, when the number of battery units needing to be charged is three, the chargers 25, 26 and 27 select two battery units from the battery unit requiring the shortest charging period and start charging their storage battery packs. When the number of battery units needing to be charged is not three, the charger 25, 26 or 27 starts charging the battery unit needing to be charged.

The charger 25, 26 or 27 sends/receives information to/from other battery units to mutually obtain latest information about charge and discharge states of the storage battery packs all the time during the charge.

When a charge stop command is given during the charge, the charger 25, 26 or 27 in charge action writes the charge information obtained until that time into the memory in the same unit and ends the charge action.

When a charge stop command is not given, the charger 25, 26 or 27 continues the charge action and determines whether a battery unit for which the charge has been completed exits or not. As the result of the determination, when no charged battery unit exists, the charger 25, 26 or 27 continues the charge action while sending/receiving information among the chargers.

When a battery unit for which charge has been completed exists, the charger of the charged battery unit writes the charge information it has at that time into the memory in the same unit.

Subsequently, the chargers 25, 26 and 27 further determine whether a battery unit needing to be charged exists or not based on the sent/received information among the chargers, and when a battery unit needing to be charged exists, the chargers 25, 26 and 27 return to the determination whether the number of battery units needing to be charged is three or not, repeat the above-described charge action to thereby charge the storage battery packs of the battery units needing to be charged.

Furthermore, after the completion of the charge, when the result of determination whether a battery unit needing to be charged exists or not is "NO", the chargers 25, 26 and 27 determine that charge for the storage battery packs of all the battery units needing to be charged is completed and end the charge action.

Figure 14:
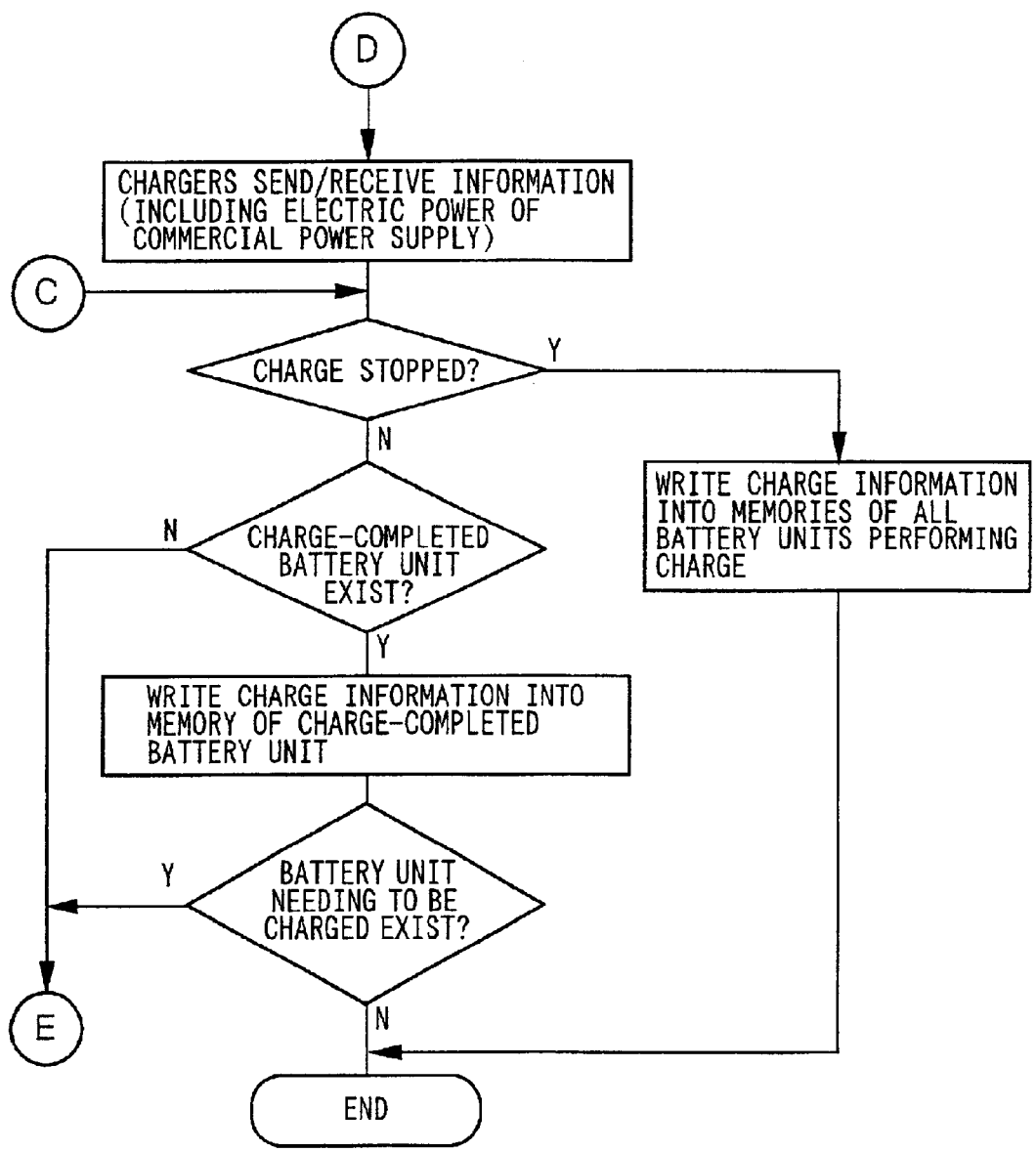
FIG. 14 is a subsequent flowchart of the same.
Figure 15:
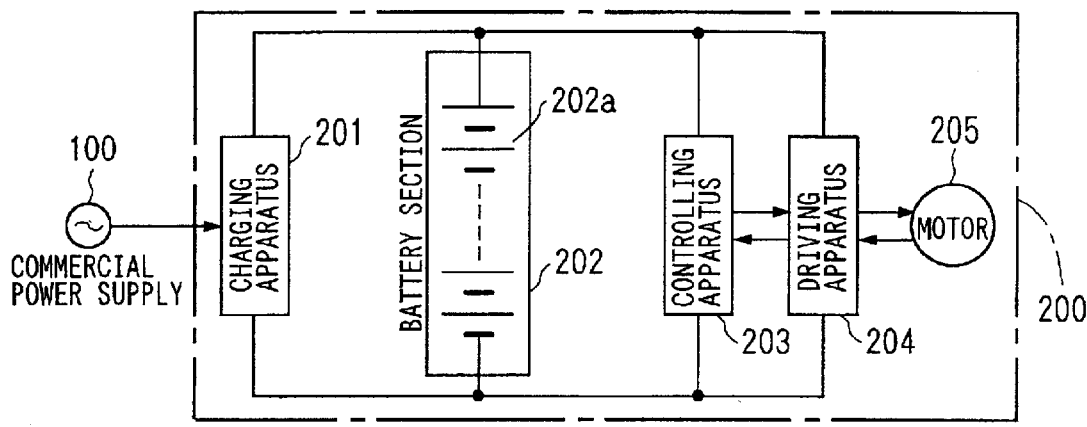
FIG. 15 is a block diagram showing an example of a conventional electric device on which a storage battery pack and a charging apparatus therefor are mounted.
Figure 16:
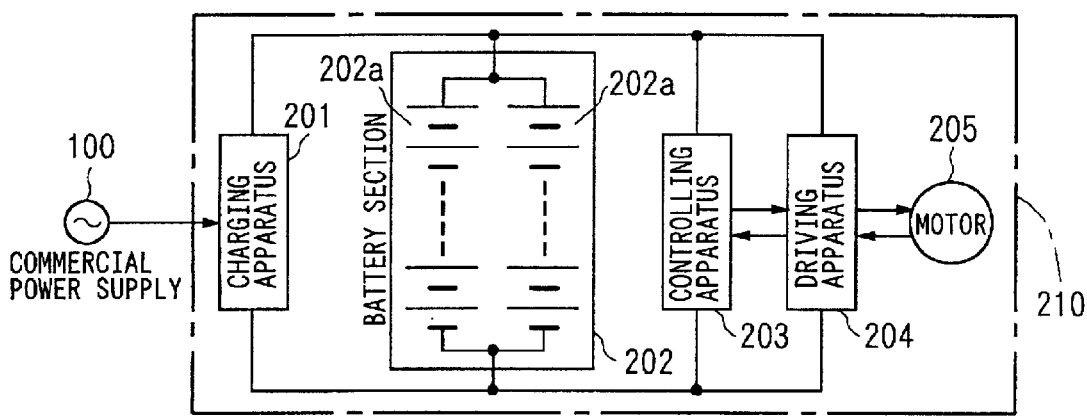
FIG. 16 is a block diagram showing another example of a conventional electric device on which storage battery packs and a charging apparatus therefor are mounted.
Figure 17:
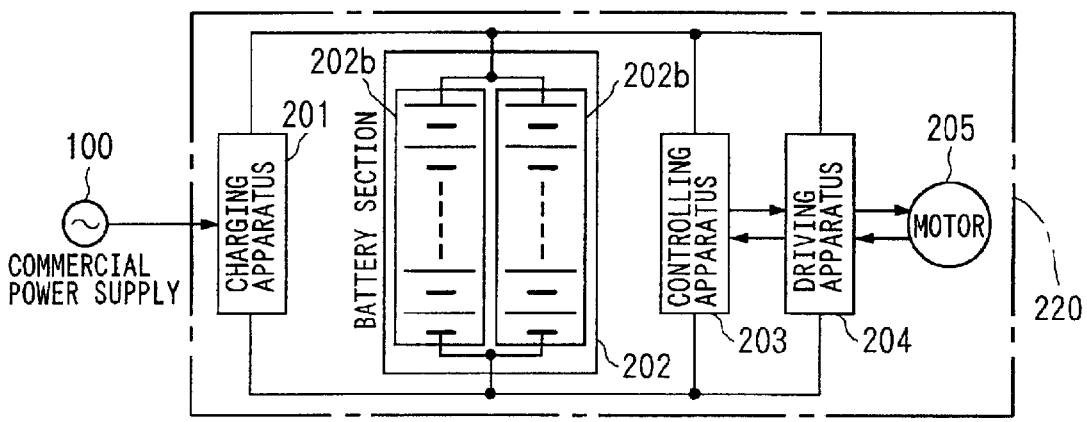
FIG. 17 is a block diagram showing still another example of a conventional electric device on which storage battery packs and a charging apparatus therefor are mounted.
Figure 18A:
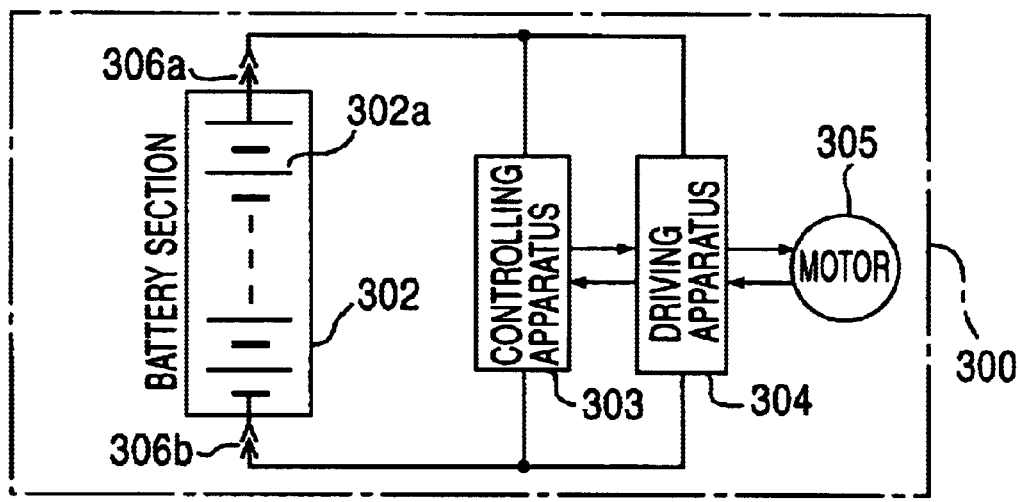
FIGS. 18A and 18B are block diagrams showing an example of a charge state of the storage battery pack by a charging apparatus which is provided separately from the conventional electric device on which the storage battery pack is mounted.
Figure 18B:
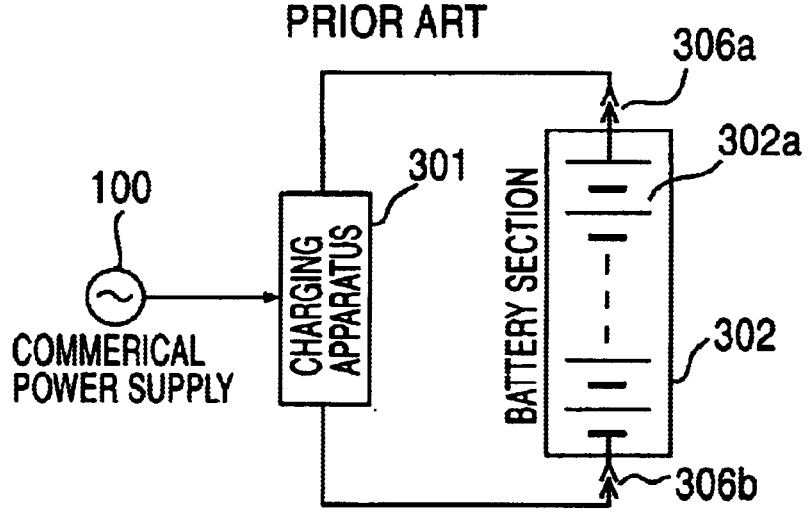
Figure 19A:
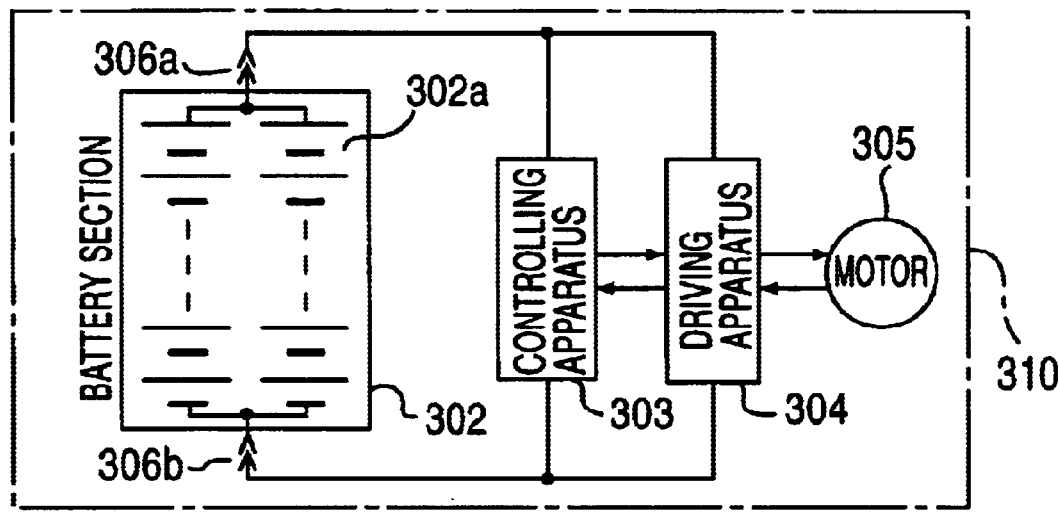
FIGS. 19A and 19B are block diagrams showing another example of a charge state of the storage battery packs by a charging apparatus which is provided separately from the conventional electric device on which the storage battery packs are mounted.
Figure 19B:
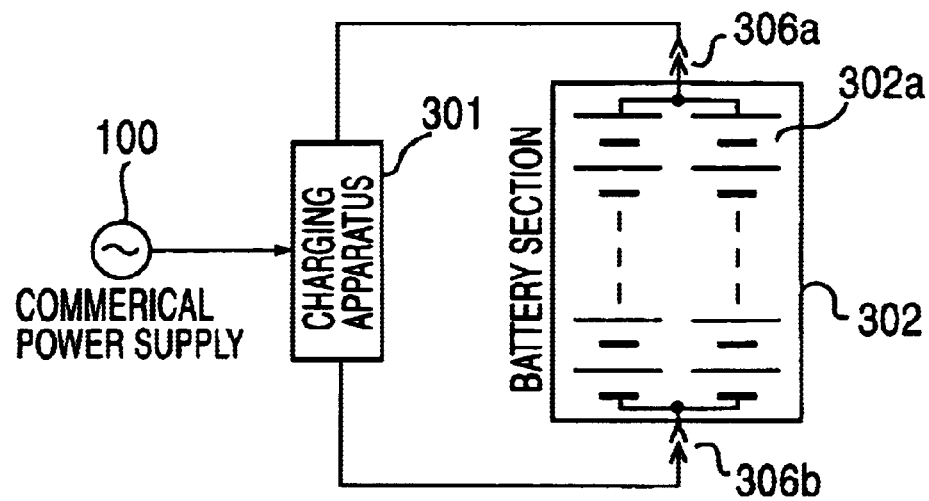
Figure 20A:
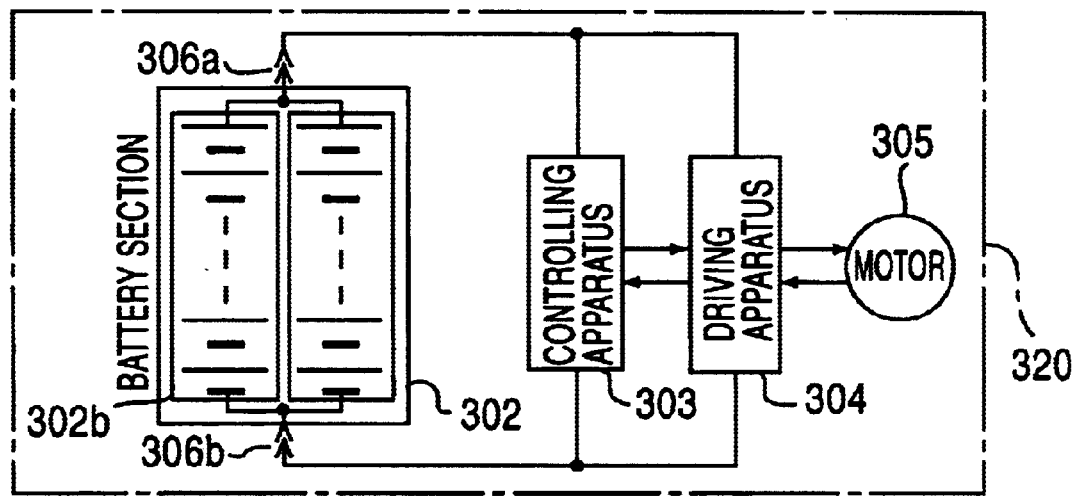
FIGS. 20A and 20B are block diagrams showing still another example of a charge state of the storage battery packs by a charging apparatus which is provided separately from the conventional electric device on which the storage battery packs are mounted.
Figure 20B:
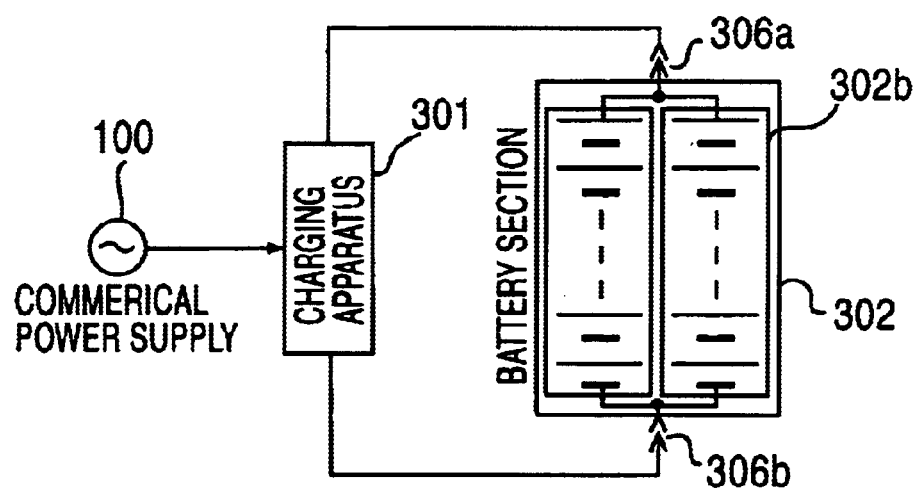

Next, a process of limiting a charging electric power (an amount of charge) related to a charging electric power control in the second embodiment is explained with flowcharts in FIG. 13 and FIG. 14.

It is difficult to suppress a charging current to decrease the charging electric power in a battery such as a Ni—Cd battery or a Ni-MH battery in which a peak (with high accuracy) at −DV or DV is detected by constant-current charging, but it is easy to suppress a charging current to decrease the charging electric power in a battery such as a lithium ion battery or a lead battery by constant-voltage/constant-current charging.

Therefore, in the example described below, a function is provided which can control a charging current (electric power) regardless of the type of the battery and further enables detection of a charging voltage and a charging current to calculate a charging electric power.

After the chargers 25, 26 and 27 of the plurality of the battery units 22, 23 and 24 start the charging electric power controlling action shown in FIG. 13 using the commercial power supply 100, the charger of each battery unit installed in the electric device 1 first sends/receives information to/from the chargers of other battery units to obtain information of the need to charge the installed battery units and charging periods thereof.

Subsequently, the chargers determine whether a battery unit needing to be charged exists or not, and when no battery unit needing to be charged exists, the chargers end all the charge action there.

When battery units needing to be charged exist, charge is started in a battery unit requiring the shortest charging period below the electric power from the commercial power supply and within the maximum capacity of the charger.

The electric power of the commercial power supply here can be obtained, for example, from the charging voltage, the charging current and the efficiency of the charger. Also after the start of the charge, each of the chargers of the plurality of the battery units sends/receives the charge information including the electric power of the commercial power supply by its charge controlling function. In the processing thereafter until the end shown in FIG. 14, the above-described processing is repeated and the same processing as in the sequential charge which has been explained with FIG. 12 are preformed, and thus the explanation thereof is omitted.

As described above, in this embodiment, the chargers 25, 26 and 27 grasp the charge information of all the mounted battery units by sending/receiving it among them all the time, and determine whether a battery unit needing to be charged next exists every time the charge has been completed for any of the storage battery packs 2B, 3B and 4B of the battery units 22, 23 and 24, or all the time at some midpoints during the charge.

When a battery unit needing to be charged exists, charge is started in the battery unit requiring the next shorter charging period below the electric power from the commercial power supply 100 and within the maximum capacity of the charger.

In other words, the charger of each battery unit grasps the charge information of the chargers of all of the other battery units to thereby grasp the total electric power that each battery unit demands of the commercial power supply 100.

By grasping the total electric power, each charger adjusts its own charging electric power to enable parallel charge within the capacity of the commercial power supply 100 all the time.

For example, a battery such as a lithium ion battery, in which charge is performed by a constant-current/constant-voltage method, has characteristics that the charge starts with a constant current, the charging power is low when the voltage is low, it increases as the voltage rises, it becomes maximum when the charge goes into a constant voltage mode at a specified voltage, and thereafter the charging electric power decreases due to a decrease in charging current.

Each charger acts to a limit of allowable power of the commercial power supply by utilizing the above-described characteristics that the required charging electric power changes in accordance with the charging state, which enables an efficient charge. While this explanation is about the battery which is charged by the constant-current/constant-voltage method, the same effects can naturally be obtained in a battery having other characteristics by grasping its characteristics and controlling charge.

In the example explained with FIG. 13 and FIG. 14, the charge is started in order from the storage battery pack of the battery unit requiring the shortest charging period, which may be changed into a charge starting from the battery unit requiring the largest charging electric power, a charge starting from the battery unit requiring the smallest charging electric power, or the like. In any case, its purpose is achieved by deciding the charge order suitable for the characteristics of the storage battery pack and the characteristics of the electric device to perform charge.

The battery unit in which the storage battery pack has been charged waits until its charger writes the charge information into its memory at that time by its charge controller and charge for all the battery units is completed, and all the charge is completed to thereby end the charge action. When the charge is stopped by shutdown of the commercial power supply or charge stop operation, the chargers in the battery units for which charge action has been started write the charge information until then into the respective memories and end the charge action, in the same manner as described above.

Figure 5:
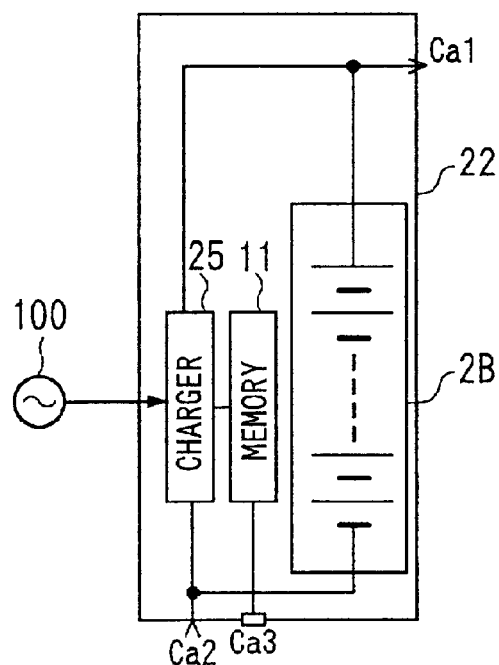
FIG. 5 is a diagram where charge is performed with one battery unit detached from the electric device shown in FIG. 2.

FIG. 5 is a diagram showing a charging method when a set of the battery unit in FIG. 2 is detached from the electric device 1 to charge the storage battery pack thereof, showing an example of the battery unit 22. The point differing from the above-described method of charging on the electric device 1 is that the storage battery packs of the plurality of the battery units are not charged in sequence but the battery units 22, 23 and 24 are separately detached from the electric device 1, the chargers 25, 26 and 27 are connected to the commercial power supply 100 to charge the storage battery packs 2B, 3B and 4B in a single manner, and mounted on the electric device 1 again.

When the plurality of the battery units are detached, the battery units are connected such that the chargers thereof can send/receive the charge information among them of the battery units in the same manner as when they are mounted on the electric device 1, which enables parallel charge action within the allowable power of the commercial power supply even when the plurality of the battery units are connected to one outlet of the commercial power supply.

According to this embodiment, it is unnecessary to mount a charger unit on the electric device or to provide a separate charging apparatus, and thus the storage battery packs can be charged on an every-battery-unit basis at any time and anywhere with only the commercial power supply. Further, when the storage battery packs of the plurality of the battery units are charged, the above-described sequential charge and charging electric power control can easily be conducted.

Third Embodiment

Figure 3:
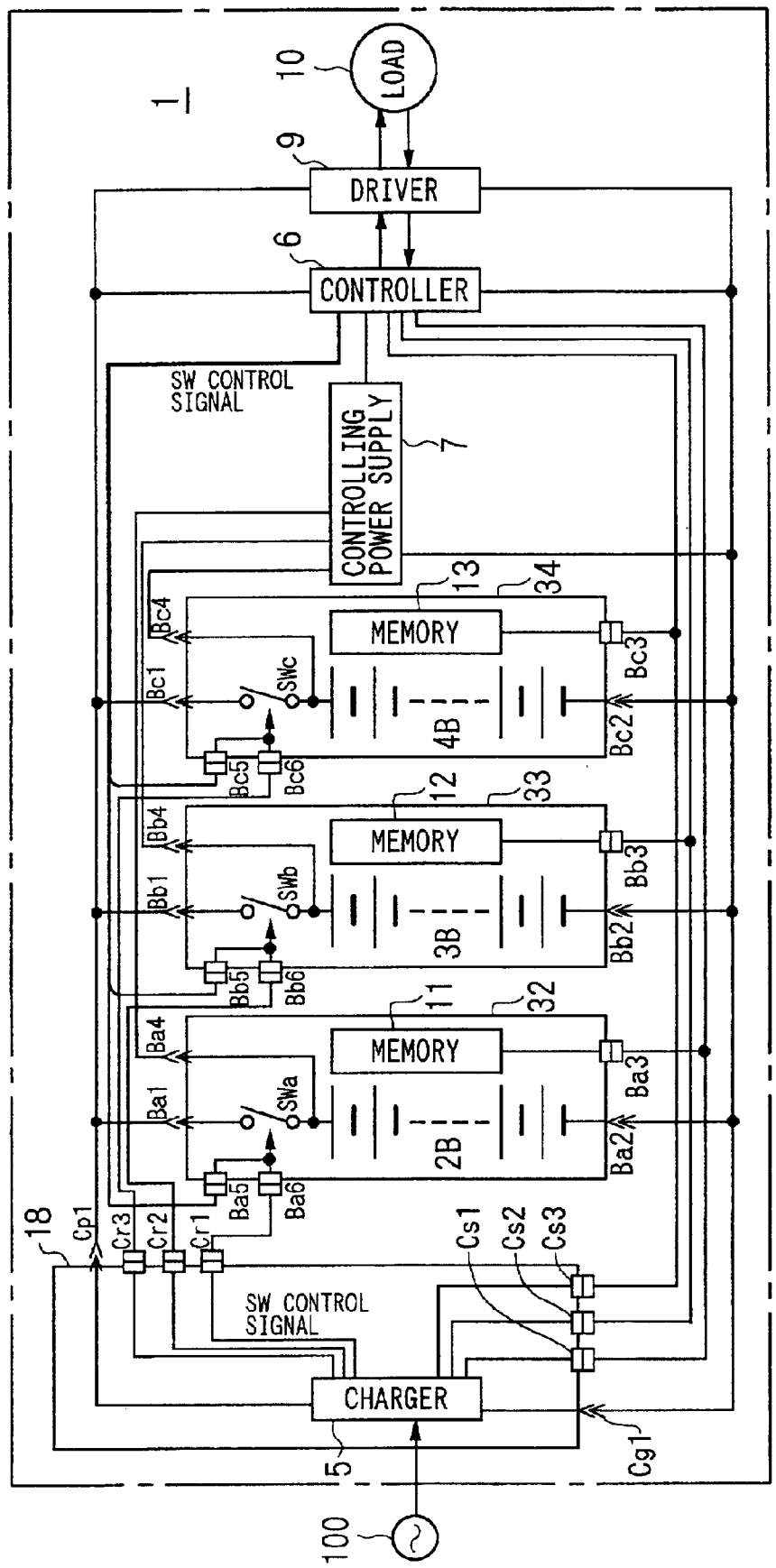
FIG. 3 is a block circuit diagram of an electric device showing a third embodiment of the invention on which battery units are mounted.

FIG. 3 is a block circuit diagram of an electric device showing a third embodiment of the invention on which battery units are mounted, in which the same portions as those in FIG. 1 are assigned the same numerals and the description thereof is omitted.

Battery units 32, 33 and 34 of the third embodiment shown in FIG. 3 include therein respectively, as in the battery units of the first embodiment, storage battery packs 2B, 3B and 4B paired for integration with memories 11, 12 and 13 for storing information about charge and discharge states thereof, and is provided with switches SWa, SWb and SWc in series with the storage battery packs 2B, 3B and 4B, respectively.

Each switch serves both as the switch SW21, SW22 or SW23 provided in the charger unit 8 in FIG. 1 and the switch SW11, SW12 or SW13 controlled by the controller 6 to reduce cost of products.

The battery units 32, 33 and 34 are detachably mounted on the main body of an electric device 1. The battery units 32, 33 and 34 are respectively provided with series circuits composed of the storage battery packs 2B, 3B and 4B and the switches SWa, SWb and SWc, control terminals of the respective switches SWa, SWb and SWc, and terminals for connecting the memories 11, 12 and 13 to the outside (terminals on the respective unit sides of connectors Ba1 to Ba6, connectors Bb1 to Bb6, and connectors Bc1 to Bc6).

Further, battery unit installation sections of the electric device 1 are provided with fixed terminals of the connectors Ba1 to Ba6, the connectors Bb1 to Bb6, and the connectors Bc1 to Bc6 for performing electrical connection and disconnection to/from the aforementioned terminals incident to attachment and detachment of the battery units 32, 33 and 34.

On the electric device 1 of the third embodiment, the above-described plurality of the battery units 32, 33 and 34 are mounted, and a charger unit 18 provided with a charger 5 is detachably mounted. This electric device 1 is the same as in the first embodiment shown in FIG. 1 in that it further comprises a controller 6, a controlling power supply 7 and a driver 9 for driving a load 10 such as an electric motor or the like at a request from the controller 6, but it is not provided with the switches SW11, SW12 and SW13 which are controlled by the controller 6.

The charger unit 18 is constituted such that the switches SW21, SW22 and SW23 in FIG. 1 are omitted from the charger unit 8 to separately output an SW control signal to three connectors Cr1, Cr2 and Cr3, and three earth-side connectors Cg1, Cg2 and Cg3 in FIG. 1 are integrated into one earth-side connector Cg1.

In this embodiment, corresponding with the provision of the switches SWa, SWb and SWc in the battery units 32, 33 and 34 respectively, the charger 5 of the charger unit 18 separately opens/closes the switches SWa, SWb and SWc in the battery units 32, 33 and 34 by the SW control signal based on the charge controlling function thereof.

The controller 6 can also separately open/close the switches SWa, SWb and SWc in the battery units 32, 33 and 34 respectively by an SW control signal based on the charge controlling function thereof.

Here, priority is given to either the SW control signal from the charger 5 or the SW control signal from the controller 6 and, for example, in the case of giving priority to the charger 5, connection to the commercial power supply 100 is detected and its information is transmitted to the controller 6 to inhibit the controller 6 from outputting the SW control signal, thereby securing normal actions of the three switches SWa, SWb and SWc.

Further, connector circuits for supplying outputs of the non-switched storage battery packs 2B, 3B and 4B in the battery units 32, 33 and 34 to the controlling power supply 7 are provided to perform supply of required electric power to the controller 6 when any of the battery units is mounted, which is the function of the controlling power supply 7.

Despite the difference that the switches SW21, SW22 and SW23 in the charger unit 8 in the first embodiment shown in FIG. 1 are replaced with the switches SWa, SWb and SWc respectively provided in the battery units 32, 33 and 34, and that the SW2n control signal is replaced with the SW control signal, the charge action in the electric device of the third embodiment is the same as the charge action in the first embodiment shown in FIG. 7 and FIG. 8 except for the above points, and thus the explanation thereof is omitted here.

Despite the difference that the switches SW11, SW12 and SW13 shown in FIG. 1 are replaced with the switches SWa, SWb and SWc respectively provided in the battery units 32, 33 and 34, and that the SW1n control signal in the first embodiment (FIG. 1) is replaced with the SW control signal, the operating (load drive) action by the electric device 1 of the third embodiment is the same as the action by the electric device 1 in the first embodiment shown in FIG. 9 and FIG. 10, except for the above points, and thus the explanation thereof is omitted here.

FIG. 6 shows a state in which the charge is performed with the charger unit 18 and the plurality of the battery units 32, 33 and 34 detached from the electric device 1 shown in FIG. 3. The charge action thereof is the same as the charge action in accordance with the first embodiment described with FIG. 4, and thus the explanation is omitted.

It should be noted that the switches SW11, SW12 and SW13 in the battery units 22, 23 and 24 can also be omitted in the second embodiment shown in FIG. 2 by providing switches in series with the storage battery packs 2B, 3B and 4B respectively in a manner to be on/off controllable from the outside.

Next, the most characteristic points of the invention, that is, effects due to the integration of the storage battery pack paired with the memory for storing information about the charge and discharge states thereof to constitute the battery unit are explained.

The information to be stored in the memory of the battery unit according to the invention includes various kinds of information as follows, including at least the information about charge and discharge states of the battery (storage battery pack) in the same unit:

(1) Battery characteristics such as rated capacity of battery, charge characteristics, discharge load characteristics, cycle characteristics, preservation characteristics, temperature characteristics, and the like;

(2) History of charge and discharge such as voltage at the start of charge, integrated charge capacity, temperature in charging, integrated discharge capacity, temperature in discharging, voltage at the end of discharge, remaining capacity, the number of discharge-cycles, charge and discharge capacity results, temperature in use, and the like; and (3) Correction data such as battery characteristics of capacity of the battery, charge characteristics, and discharge load characteristics, and fundamental constant used for managing and controlling the battery, and the like.

It is possible to store information of management in accordance with the battery characteristics, information of environment and result of the battery in use, correction information for each information based on use result of the battery, information of characteristics of the electric device affecting the battery as required, and the like.

As described above, in this invention, it is possible to grasp all the time the state of the battery characteristics such as the capacity of the battery (storage battery pack) in the battery unit, the charge characteristics, the discharge load characteristics, and the like by handling the memory being integrated with the battery unit. As a result, the following many effects can be obtained:

(1) It becomes possible to use the battery under control of the remaining capacity by virtue of the memory of each battery unit regardless of the state of the battery, such as the battery being completely (fully) charged, half charged, or during discharge, which enables free exchange of the battery units.

(2) The determinations can be made to the charge order such that charging is performed starting from a battery unit having a smaller remaining capacity or from a battery unit having a larger remaining capacity based on the information in the memory of the battery units; or charging is performed starting from a battery unit having fewer charge and discharge cycles based on the information of the number of the correction cycles to level the use rates of the battery units, or the like, which makes it possible to perform charge starting from the battery unit in accordance with user's will or suitable for the characteristics of the batteries and the electric device.

(3) The determinations can be made of the discharge order such that discharge is performed starting from a battery unit having a smaller remaining capacity based on the information of the memories of the battery units, or starting from a battery unit susceptible to occurrence of the memory effect based on the history information to increase opportunities for the battery to discharge to a cutoff voltage so as to prevent the memory effect, when a battery in which a memory effect occurs is in use, or discharge is performed starting from a battery unit having fewer charge and discharge cycles to level the use rates of the battery units, or the like.

(4) Charge after refresh can be automatically performed when there is a possibility of occurrence of the memory effect, or refresh can be automatically performed only when the remaining capacity is below a specified value, based on a capacity change rate of the charge and discharge history information, information of repeating charge and discharge, and the like, to shorten the refresh period.

(5) Based on the charge information and the discharge information in the charge and discharge history information in the memories of the battery units, the charge and discharge orders are optimally decided to increase the probability of complete charge or complete discharge, and correction of the management of the remaining capacity of the battery is performed at a break of the charge and discharge action to improve the detection accuracy of the remaining capacity of the battery unit, which enables an appropriate operation of the electric device.

(6) It is possible to determine the battery life based on use history information, such as the number of charge and discharge cycles, the charge and discharge capacity results and the like, from the memories of the battery units to level the lives of the batteries by performing discharge starting from, for example, a battery unit having fewer charges and discharges.

(7) Especially with a battery, such as a Ni—Cd battery, a Ni-MH battery or the like, having characteristics that the memory effect occurs, discharge can be started from the a battery unit which is susceptible to occurrence of the memory effect in the discharge order based on the cut-off voltage information of discharge in the charge and discharge history information to improve the rate of reaching the discharge cut-off voltage, which enables prevention of the memory effect.

(8) Batteries of the same type but having different capacities from each other are managed based on battery characteristic information, such as the rated capacity of the battery, the discharge load characteristics and the like, the charge and discharge history information, and the correction data and the like from the memories of the battery units, which enables the use of the use batteries having different capacities in a mixed manner.

(9) Even when battery units provided with different types of batteries exist in a mixed manner in a configuration composed of a plurality of the battery units, each battery is managed based on the battery characteristics information, the charge and discharge history information, the correction data and the like in the memory of each battery unit, which enables the use of the different types of batteries in a mixed manner.

(10) The batteries (storage battery packs) are paired for integration with the memories for storing the information such as the battery characteristics information, the charge and discharge history information, the correction data and the like to constitute units which are attachable/detachable to/from the electric device, which allows the battery units to be shared in the electric device having a plurality of battery units, so that the charging of the batteries at a battery station or the like can be facilitated.

(11) In the case of using an electric motor, the battery section is divided into plural sections and the battery sections and the memories are integrated, which enables a larger regenerative electric power to be recovered by supplying its regenerative electric power to a battery of the mounted battery unit having a great depth of discharge to thereby improve its recovery efficiency.

(12) By mounting a plurality of battery units having a required capacity, only a single battery unit can operate the electric device, and other battery units can be charged even if the former battery unit is in operation.

(13) In the case in which the chargers are integrally provided in the battery units respectively, the battery units can be simultaneously charged to shorten the charge periods.

INDUSTRIAL APPLICABILITY

As has been described, according to the invention, a battery section serving as a driving energy source of an electric device such as an electric bicycle, an electric wheelchair or the like can be made easy-to-handle and efficiently used all the time.

In other words, detachment and carrying of the battery section by hand is made easier, the electric device is not necessarily moved to a place where it can be connected to the commercial power supply for charging, and a special carrier device for transporting the battery section also becomes unnecessary.

Further, it also becomes possible to perform operation of the electric device provided with plural sets of battery sections and charge of the battery sections concurrently, without requiring a special charging apparatus. Furthermore, the battery characteristics of the battery sections can be managed, and thus charge and discharge of the plural sets of battery sections can also be selected freely in accordance with respective battery characteristics. Therefore, different types of storage battery packs become usable in combination.

It is also possible to prevent a so-called memory effect when a secondary battery (storage battery) such as a Ni—Cd battery in which the memory effect occurs is used as the battery section of the electric device, and further to eliminate the need for the refresh. This can prolong the battery life.

Further, a charging apparatus can be placed at a battery station to facilitate charge, and the charge and discharge states can be recognized with a high accuracy even if the battery section is detached from the electric device, which enables an optimal charge control all the time.

Moreover, it is also possible to recover the regenerative electric power from the load side of an electric motor or the like to the battery section efficiently and to use it effectively.

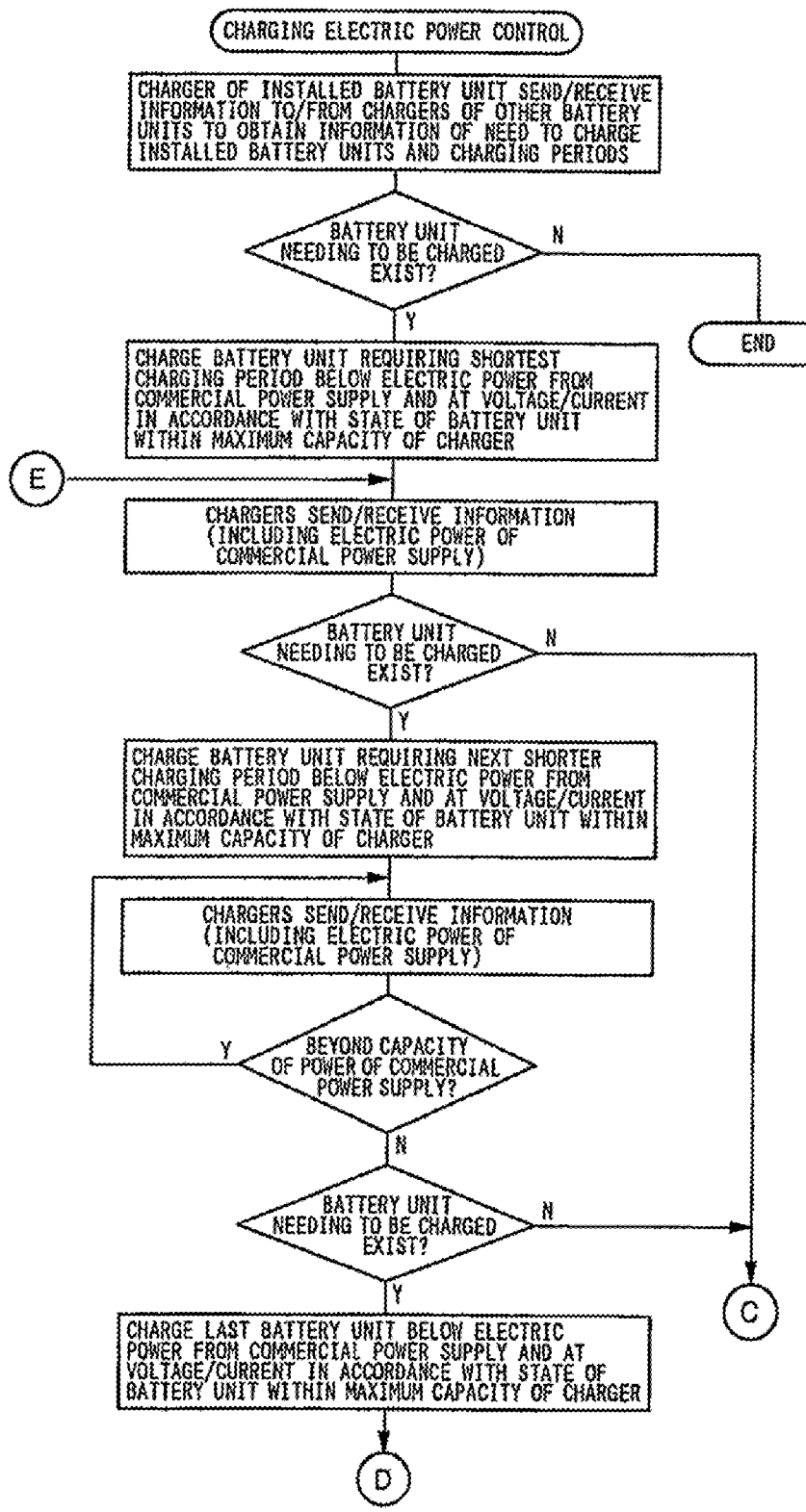

What is claimed is:

1. An electric device, comprising:
    a plurality of battery units detachably mounted thereon, each battery unit constituted by pairing a storage battery pack with a memory for storing at least information about charge and discharge states of the storage battery pack;
    connectors provided on said each battery unit for performing electrical connection/disconnection to/from other elements of said electric device;
    a driver for driving a load and a controller for controlling supply of electric power from said each battery unit through said connectors to said driver by referring to the information stored in said memory of said each mounted battery unit; and
    a charger for charging said storage battery pack through said connectors by referring to the information stored in said memory of said each battery unit;
    wherein said charger includes means for reading at least information about charge and discharge states of the storage battery pack stored in said memory of said each battery unit, and means for writing into said memory at least the information about charge and discharge states of said storage battery pack in the same unit.

2. An electric device according to claim 1,
    wherein said charger is provided in said each battery unit, and said charger has means for deciding a charge order by mutually referring to the information stored in said memory of said each mounted battery unit.

3. An electric device according to claim 1,
    wherein a switch connected to said storage battery pack in series is provided in said each battery units,
    said charger is means for charging said each storage battery pack through said switch by referring to the information stored in said memory of said each battery unit, and
    said controller is means for controlling supply of electric power from said storage battery pack to said driver through said switch of said each battery unit by referring to the information stored in said memory of said each battery unit.

4. An electric device according to claim 1, wherein
    said charger is constituted to be a unit attachable/detachable to/from said electric device main body.

5. An electric device according to claim 3, wherein
    said charger is constituted to be a unit attachable/detachable to/from said electric device main body.

6. An electric device according to claim 1, wherein
    said controller has means for reading the information stored in said memory of said each battery unit to control action of the whole device.

7. An electric device according to claim 1, wherein
    said memory of said each battery unit also stores information about characteristics of said storage battery pack, and said charger has means for controlling charge of said storage battery pack, by referring to the information about the characteristics of said storage battery pack stored in said memory of said each battery unit, in accordance with the characteristics.

8. An electric device according to claim 1, wherein said memory of said each battery unit also stores information about characteristics of said storage battery pack, and said controller has means for controlling discharge from said storage battery pack, by referring to the information about the characteristics of said storage battery pack stored in said memory of said each battery unit, in accordance with the characteristics.

9. An electric device according to claim 1, wherein said controller has means for displaying a remaining capacity of said storage battery pack of said each battery unit based on the information stored in said each battery unit, and displaying a charge request, giving an alarm, or both when a storage battery pack needing to be charged exists.

10. A method for charging and discharging a battery unit in an electric device comprising: a plurality of battery units detachably mounted thereon, each battery unit constituted by pairing a storage battery pack with a memory for storing at least information about charge and discharge states of the storage battery pack; a driver for driving a load; a controller for controlling supply of electric power from said each battery unit to said driver; and a charger for charging said storage battery pack of said each battery unit, comprising the steps of:

discharging at different times the storage battery packs of said respective mounted battery units, and then charging them by said charger under the control of said controller, by referring to the information stored in said memories; and writing into said memory at least the information about charge and discharge states of said storage battery pack in the same battery unit.

11. A method for charging and discharging the battery unit in the electric device according to claim 10, wherein the step of discharging and charging is a step of discharging the storage battery packs of said respective mounted battery units in decreasing order of remaining capacity, and charging them in increasing order of remaining capacity, by said controller and said charger, by referring to the information about charge and discharge states stored in said memories.

12. A method for charging and discharging the battery unit in the electric device according to claim 10, wherein the step of discharging and charging is a step of discharging the storage battery packs of said mounted battery units in increasing order of remaining capacity, and charging them when the remaining capacities become a predetermined value or less, by said controller and said charger, by referring to the information about charge and discharge states stored in said memories.

13. A method for charging and discharging the battery unit in the electric device according to claim 10, further comprising the steps of:

selecting one or more of said battery units by said controller and said charger by referring to the information about charge and discharge states stored in said memories; and selecting remaining one or more of said battery units by said controller and said charger by referring to the information about charge and discharge states stored in said memories, and wherein the step of discharging and charging is a step of discharging each of storage battery packs of former selected battery units, and charging each of storage battery packs of latter selected battery units, by said controller and said charger, by referring to the information about charge and discharge states stored in said memories of said mounted battery units.

14. A method for charging and discharging the battery unit in the electric device according to claim 10, wherein the step of discharging and charging is a step of discharging in order the storage battery packs of said respective mounted battery units to a predetermined remaining capacity, and then charging them, by said controller and said charger, by referring to the information about charge and discharge states stored in said memories.

* * * * *

UNITED STATES PATENT AND TRADEMARK OFFICE
CERTIFICATE OF CORRECTION

PATENT NO. : 6,741,065 B1
APPLICATION NO. : 10/030165
DATED : May 24, 2004
INVENTOR(S) : Hiroshi Ishii et al.

It is certified that error appears in the above-identified patent and that said Letters Patent is hereby corrected as shown below:

The sheet of drawing consisting of figure 13 should be added as per attached figure 13.

Signed and Sealed this

Ninth Day of October, 2007

JON W. DUDAS
*Director of the United States Patent and Trademark Office*

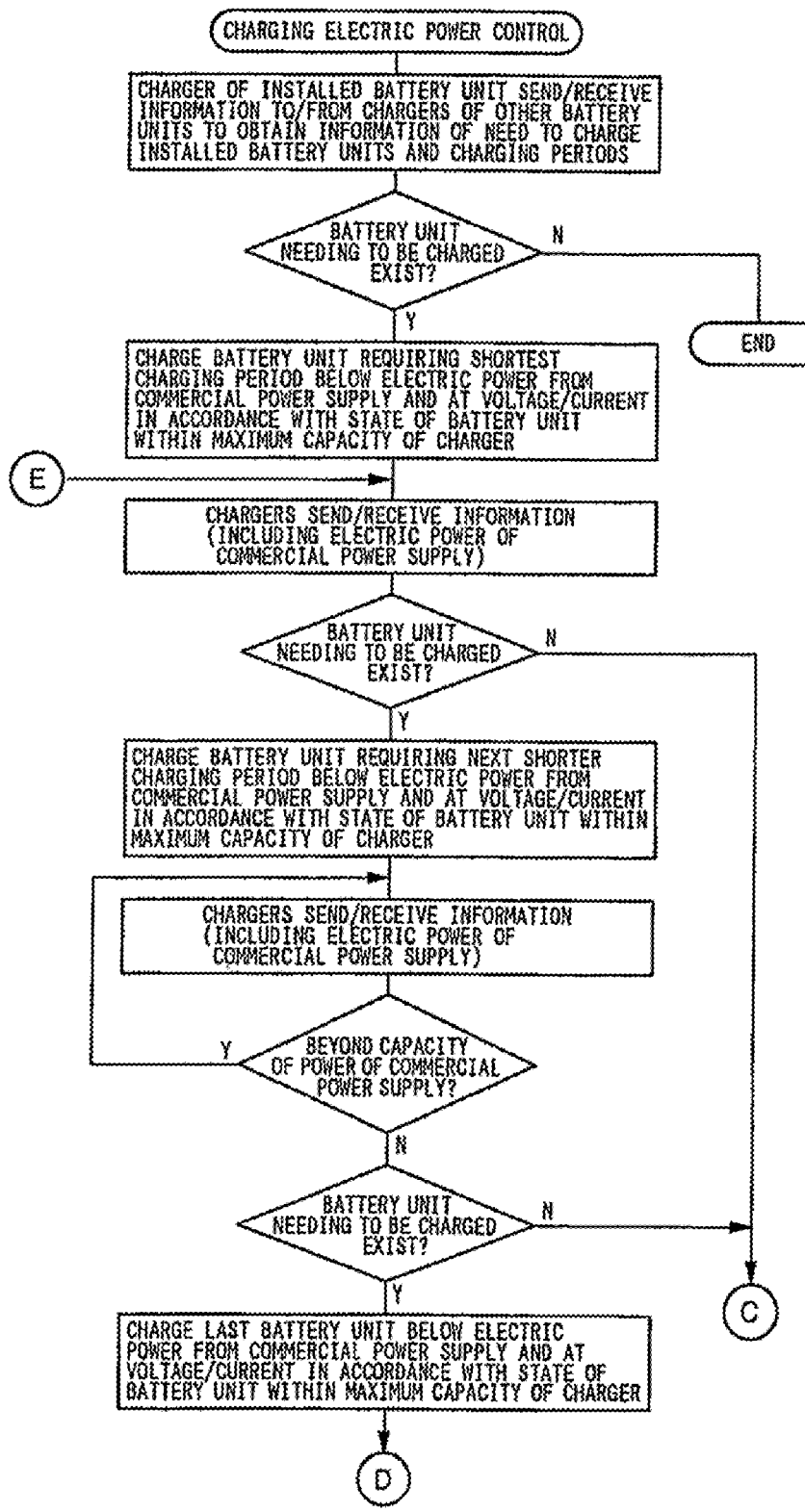

UNITED STATES PATENT AND TRADEMARK OFFICE
CERTIFICATE OF CORRECTION

PATENT NO.       : 6,741,065 B1
APPLICATION NO.  : 10/030165
DATED            : May 25, 2004
INVENTOR(S)      : Hiroshi Ishii et al.

Page 1 of 2

It is certified that error appears in the above-identified patent and that said Letters Patent is hereby corrected as shown below:

The sheet of drawing consisting of figure 13 should be added as per attached figure 13.

This certificate supersedes Certificate of Correction issued October 9, 2007.

Signed and Sealed this

Thirtieth Day of October, 2007

JON W. DUDAS
*Director of the United States Patent and Trademark Office*